(12) United States Patent
Yamamoto

(10) Patent No.: US 9,880,684 B2
(45) Date of Patent: Jan. 30, 2018

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Keiichi Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 14/854,512

(22) Filed: Sep. 15, 2015

(65) Prior Publication Data

US 2016/0077631 A1 Mar. 17, 2016

(30) Foreign Application Priority Data

Sep. 16, 2014 (JP) ................................. 2014-188071

(51) Int. Cl.
| | | |
|---|---|---|
| *G06F 3/044* | (2006.01) | |
| *G06F 3/0484* | (2013.01) | |
| *G06F 3/0488* | (2013.01) | |
| *G06F 3/0486* | (2013.01) | |

(52) U.S. Cl.
CPC ............ *G06F 3/044* (2013.01); *G06F 3/0486* (2013.01); *G06F 3/04842* (2013.01); *G06F 3/04883* (2013.01); *G06F 2203/04106* (2013.01); *G06F 2203/04108* (2013.01)

(58) Field of Classification Search
CPC . G06F 3/04842; G06F 3/0486; G06F 3/04883
See application file for complete search history.

(56) References Cited

U.S. PATENT DOCUMENTS

| | | | |
|---|---|---|---|
| 2011/0175831 A1 | 7/2011 | Miyazawa et al. | |
| 2011/0175832 A1* | 7/2011 | Miyazawa | G06F 3/041 345/173 |
| 2013/0296057 A1* | 11/2013 | Gagner | G06F 3/017 715/863 |

(Continued)

FOREIGN PATENT DOCUMENTS

| | | |
|---|---|---|
| CN | 102129313 A | 7/2011 |
| CN | 102129314 A | 7/2011 |
| CN | 102591450 A | 7/2012 |

(Continued)

*Primary Examiner* — Kevin M Nguyen
(74) *Attorney, Agent, or Firm* — Canon U.S.A., Inc. IP Division

(57) ABSTRACT

An information processing apparatus includes a touch position detection unit configured to detect a touch position indicated by an operation object in contact with an input target surface, a proximity position detection unit configured to detect a proximity position indicated by an operation object in proximity to the input target surface, and a recognition unit configured to recognize that an operation object has started a moving operation, based on a condition to be satisfied by a movement amount of the touch position detected by the touch position detection unit. The condition changes according to a movement amount of the proximity position detected by the proximity position detection unit before the touch position detection unit starts to detect the touch position.

19 Claims, 8 Drawing Sheets

(56) References Cited

U.S. PATENT DOCUMENTS

2014/0176477 A1    6/2014  Nakao

FOREIGN PATENT DOCUMENTS

| EP | 2458490 A2 | 5/2012 |
| EP | 2469393 A2 | 6/2012 |
| EP | 2690536 A1 | 1/2014 |
| JP | 2011-134212 A | 7/2011 |
| JP | 2012-203433 A | 10/2012 |
| JP | 2012-247960 A | 12/2012 |
| JP | 2014-182497 A | 9/2014 |

* cited by examiner

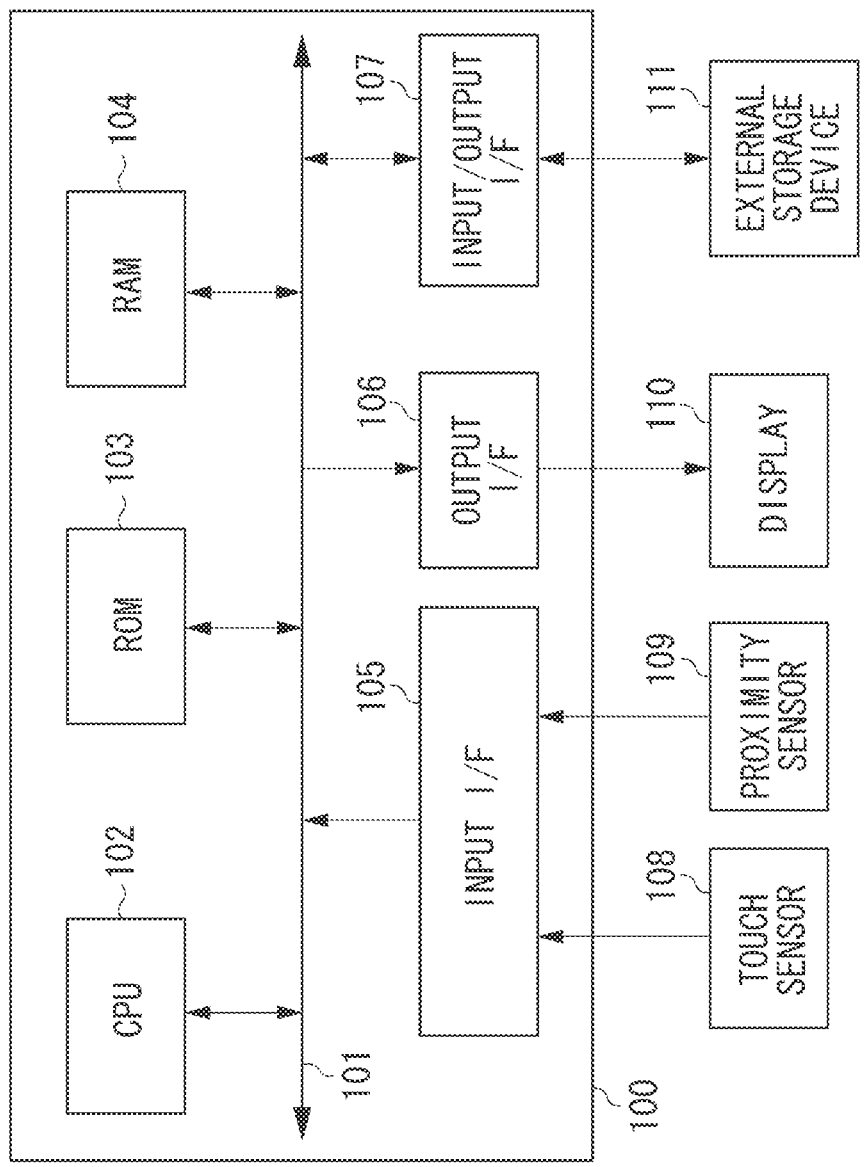

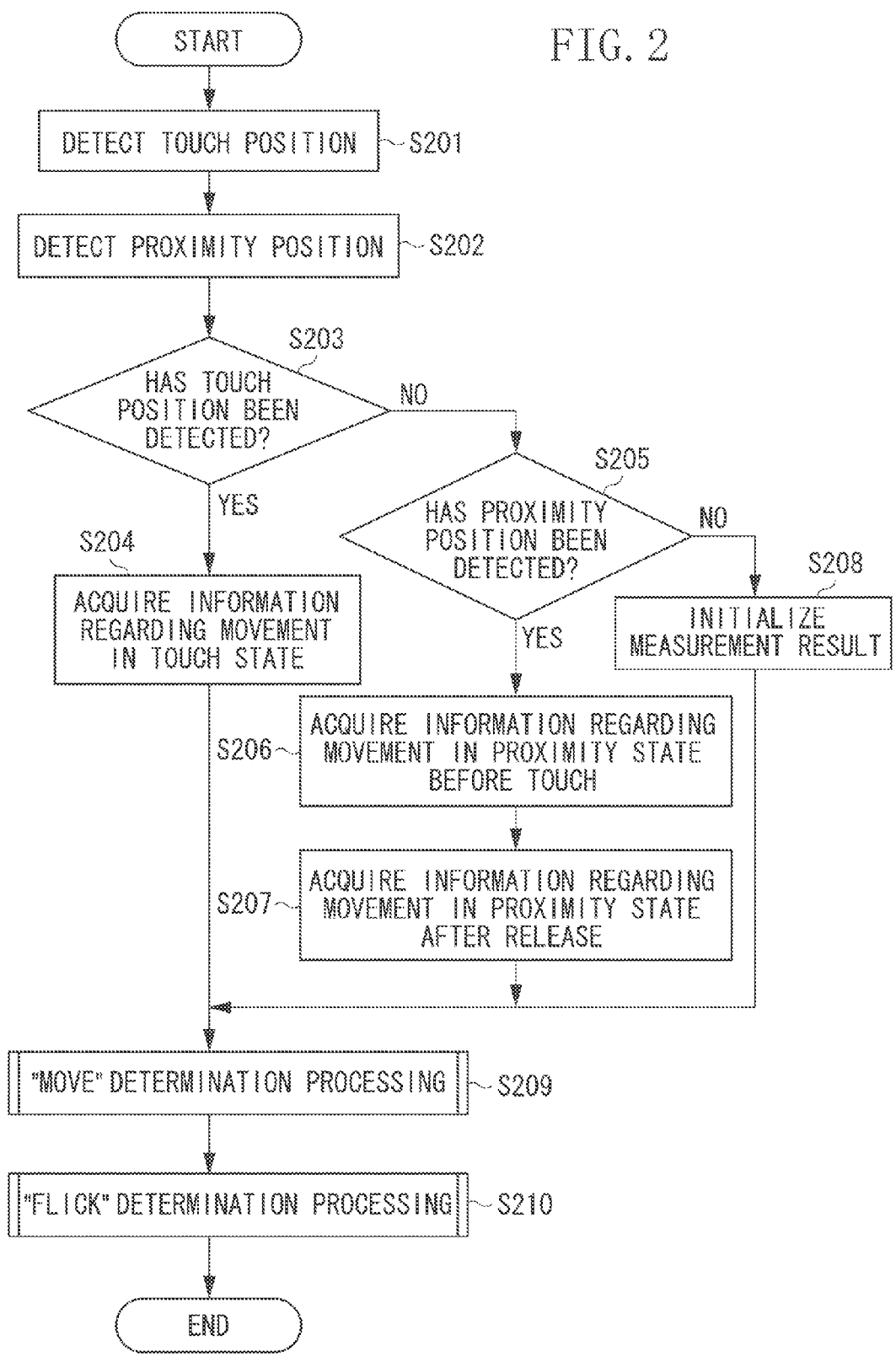

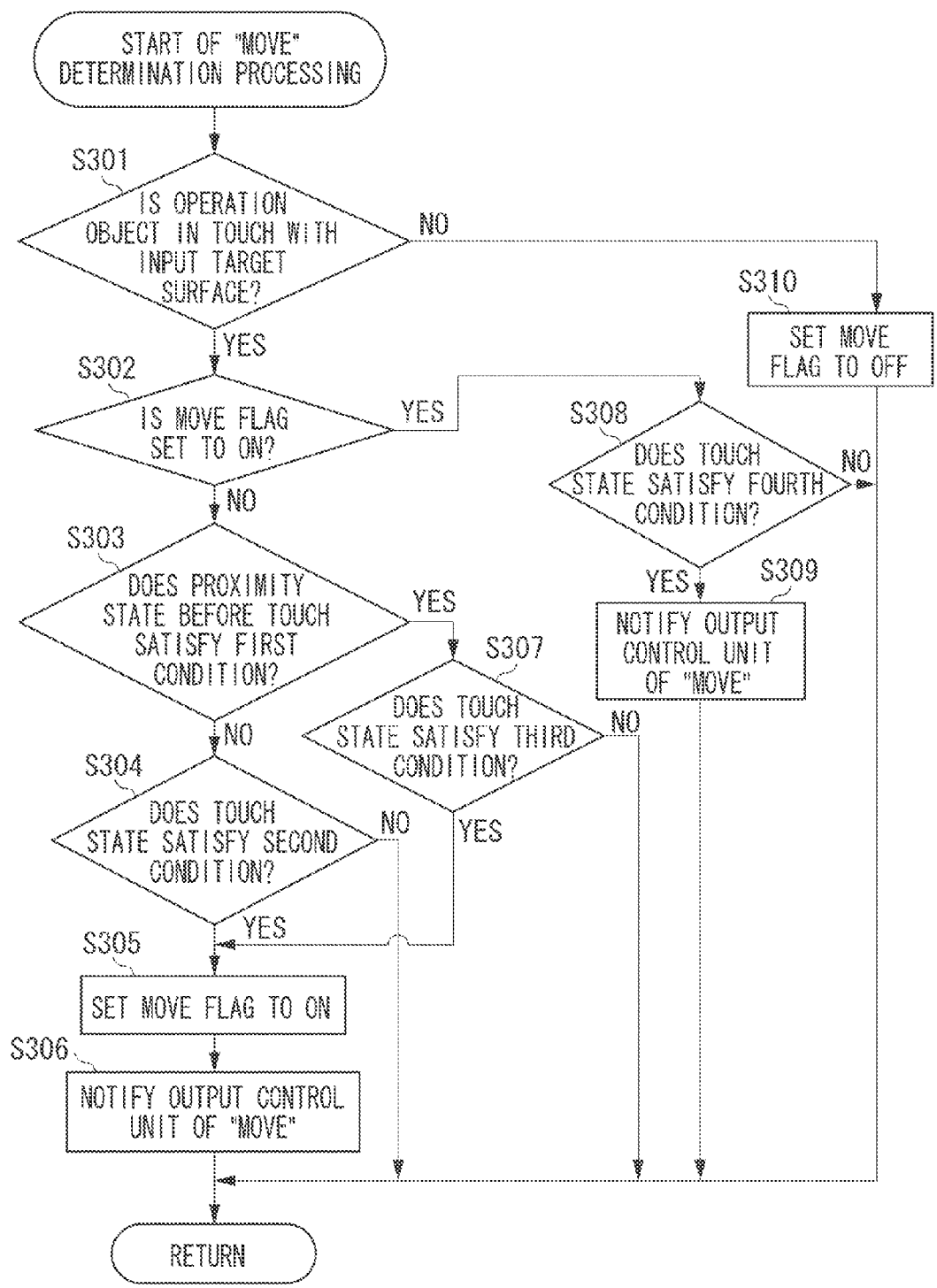

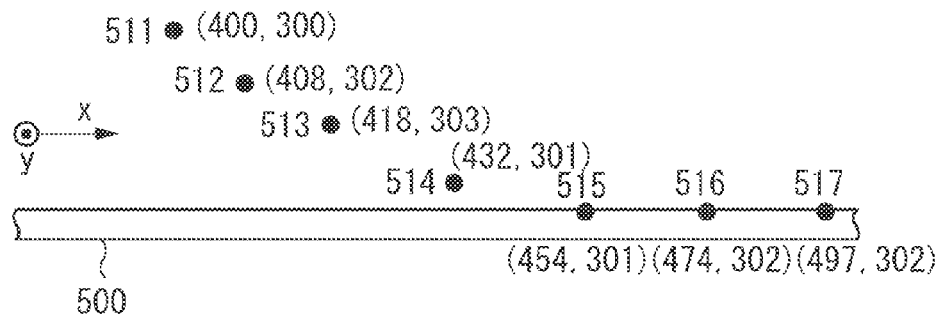
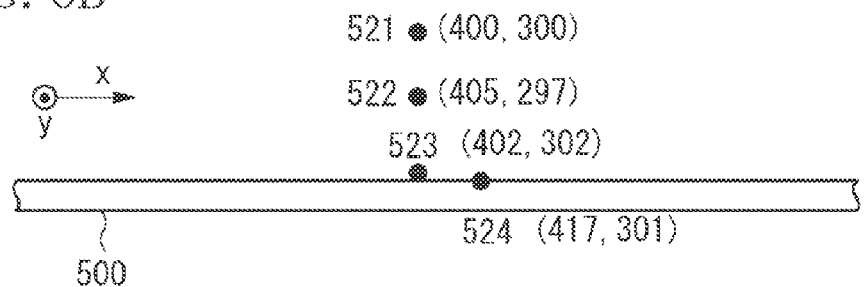
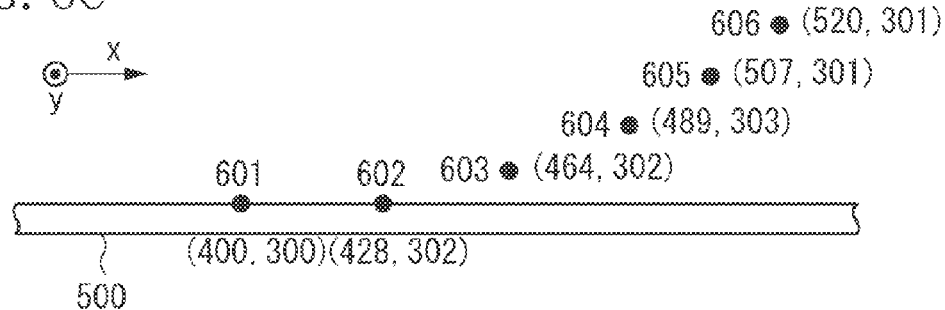
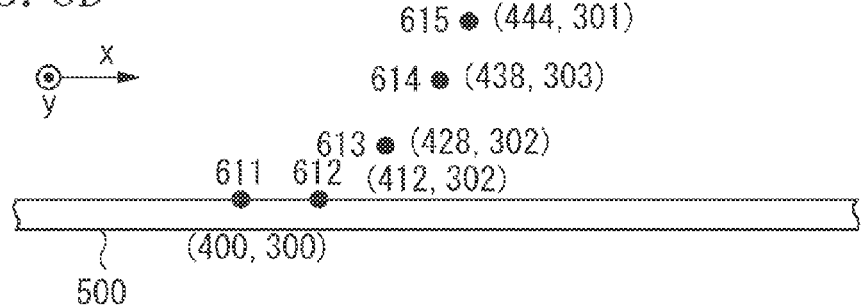

INFORMATION PROCESSING APPARATUS, METHOD FOR CONTROLLING INFORMATION PROCESSING APPARATUS, AND STORAGE MEDIUM

BACKGROUND OF THE INVENTION

Field of the Invention

The present invention relates to a technique for recognizing a plurality of types of input operations.

Description of the Related Art

In recent years, there have been widely used touch input apparatuses that recognize a touch operation based on X and Y coordinate values of a position at which an input unit such as a touch panel is touched by an operation object such as a user's finger or a stylus, and perform various kinds of processing according to the touch operation. Generally, the touch input apparatuses recognize the touch operation based on whether information such as the touched position, and a movement distance, a movement speed, and an input time of the touched position satisfies a predetermined condition. Japanese Patent Application Laid-Open No. 2011-134212 discusses a method in which a "move" (an operation of moving the operation object while keeping the operation object in contact with the input unit) is determined to have been input if the variance value of a touch position is larger than a predetermined value.

Further, there have been also emerging apparatuses that are operable based on X and Y coordinate values of the operation object being in a proximity state with respect to the input unit. The proximity state is a state where the operation object is slightly away from the input unit and is also referred to as a hover state. Japanese Patent Application Laid-Open No. 2012-247960 discusses that a touch operation which is identified based on position information of the operation object being in the proximity state before touching the input unit is performed at the time when the operation object has touched the input unit.

Recognizing the operation based on only the information of the operation object being in contact with the input unit, as discussed in Japanese Patent Application Laid-Open No. 2011-134212, or only the information of the operation object being in the proximity state, as discussed in Japanese Patent Application Laid-Open No. 2012-247960, raises a problem that such recognition is easily affected by detection accuracy of a sensor or an unintended movement of a user. For example, a small vibration of the operation object may be detected at the moment when the user has touched the input unit even though the user has no intention to move the operation object and as a result, the operation according to the movement of the operation object may be incorrectly recognized.

SUMMARY OF THE INVENTION

According to an aspect of the present invention, an information processing apparatus includes a touch position detection unit configured to detect a touch position indicated by an operation object in contact with an input target surface, a proximity position detection unit configured to detect a proximity position indicated by an operation object in proximity to the input target surface, and a recognition unit configured to recognize that an operation object has started a moving operation, based on a condition to be satisfied by a movement amount of the touch position detected by the touch position detection unit. The condition changes according to a movement amount of the proximity position detected by the proximity position detection unit before the touch position detection unit starts to detect the touch position.

Further features of the present invention will become apparent from the following description of exemplary embodiments with reference to the attached drawings.

BRIEF DESCRIPTION OF THE DRAWINGS

FIGS. 1A and 1B are block diagrams illustrating an example of a hardware configuration of an information processing apparatus and an example of a functional configuration of the information processing apparatus, respectively.

FIG. 2 is a flowchart illustrating an example of a flow of processing for determining a touch operation.

FIG. 3 is a flowchart illustrating an example of a flow of processing for determining a "move".

FIGS. 6A, 6B, 6C, and 6D each illustrate a specific example of a series of input positions detected during, and before or after the touch operation.

DESCRIPTION OF THE EMBODIMENTS

Figure 1B:
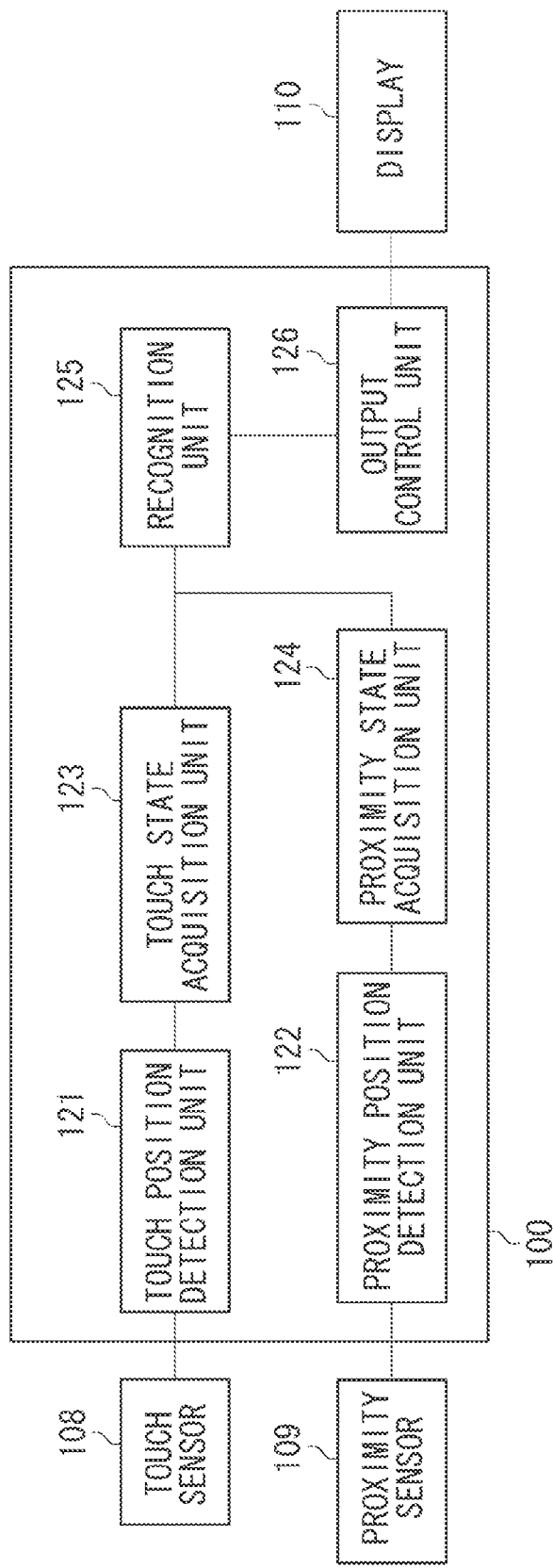

Exemplary embodiments of the present invention will be described in detail with reference to the attached drawings. However, components that will be described in the exemplary embodiments are only examples, and the scope of the present invention is not limited thereto.

In a first exemplary embodiment, an input of a touch operation is recognized based on conditions for both a detected position of a touch, and position information in the proximity state before or after the input of the touch.

FIG. 1A illustrates an example of a hardware configuration of an information processing apparatus 100 according to the present exemplary embodiment. A system bus 101 connects individual components included in the information processing apparatus 100 to one another, and allows the components to exchange information with one another. A central processing unit (CPU) 102 performs calculation, logical determination, and the like for various kinds of processing, and controls each of the components connected to the system bus 101. Memories including a program memory and a data memory are mounted on the information processing apparatus 100. A read-only memory (ROM) 103 is the program memory, and stores a program for the CPU 102 to perform control, which includes various kinds of processing procedures that will be described below. A random access memory (RAM) 104 is the data memory, and includes a work area for the above-described program for the CPU 102, a data save area at the time of error processing, an area into which the above-described control program is loaded, and the like. The program memory may be realized by loading the program from an external storage device 111 or the like into the RAM 104 via an input/output interface 107. The external storage device 111 can be realized by, for example, a medium (a storage medium), and an external storage drive for implementing access to the medium. Known examples of such a medium include a flexible disk (FD), a compact disk-read only memory (CD-ROM), a digital versatile disk (DVD), a universal serial bus (USB) memory, a magneto-optical disk (MO), and a flash memory. Further, the external storage device 111 may be a server apparatus connected to the information processing apparatus 100 via a network. Information required to execute the program according to the present exemplary embodiment is stored in the ROM 103 or the external storage device 111. Especially in the present exemplary embodiment, the information includes a library or dictionary in which a combination of respective conditions that should be satisfied while the operation object is in a touch state, and while it is in a proximity state is associated in advance with a certain specific user operation as the conditions to be satisfied when the specific touch operation is input. The touch state is a state where an operation object is in contact with an input target surface, and the proximity state is a state where the operation object is in proximity to the input target surface. An input interface 105 controls an input unit such as a pointing device, acquires an input signal, and notifies a system of the acquired input signal via the system bus 101. An output interface 106 outputs at least a signal for controlling an output of a result of performing the various kinds of processing that will be described below, to an output unit including a display unit.

A touch sensor 108 detects the touch position at which the operation object touches the input target surface of the input unit, and notifies the input interface 105 of the detected touch position. Various types of touch panels using, for example, a resistive film method, an electrostatic capacitance method, an infrared ray method, an ultrasonic method, an acoustic wave method, and a vibration detection method, can be used as the touch sensor 108. Besides them, the touch position may be acquired by using a device capable of detecting a position in a three-dimensional space, such as a range image sensor and a stereo camera, to detect whether the operation object has touched the input target surface and then acquiring position information defined on the input target surface.

A proximity sensor 109 detects the position information of the operation object being in proximity to the input target surface before and after the touch position is detected, and notifies the input interface 105 of the detected position information. In the present exemplary embodiment, at least during a series of movements of the operation object, in a case where the touch sensor 108 detects the touch position, the proximity sensor 109 detects positions of the operation object being in the proximity state before and after the detection of the touch position (i.e., positions continuous from the touch position). However, it is assumed that the position information that is detected by the proximity sensor 109 as the position of the operation object being in the proximity state (hereinafter simply referred to as the proximity position) is a position of the operation object being in a state where the touch position is not detected by the touch sensor 108. In other words, it is preferable that the touch sensor 108 and the proximity sensor 109 are adjusted so that they cannot detect the position information of the operation object at the same time. Touch panels using, for example, the electrostatic capacitance method, the infrared ray method, the ultrasonic method, and the acoustic wave method can be used as the proximity sensor 109. Increasing the sensitivity of these touch panels allows the position information of the operation object to be detected not only in the state where the operation object is in contact with the input target surface but also in the state where the operation object is in proximity to the input target surface. The information processing apparatus 100 may be notified of the signals output from the touch sensor 108 and the proximity sensor 109 collectively as a signal output from the touch panel. Besides those touch panels, the position of the operation object not in contact with the input target surface can also be obtained by detecting a position in the three-dimensional space using the range image sensor, the stereo camera, or the like.

A display 110 displays the result of performing the various kinds of processing in the information processing apparatus 100. Examples of the display 110 include a liquid crystal display, a television monitor, and a projector. In the present exemplary embodiment, the information processing apparatus 100 uses a touch panel display in which a capacitance-type touch panel serving as the touch sensor 108 and the proximity sensor 109 is mounted so as to be overlaid on a display screen of the liquid crystal display serving as the display 110. In other words, the surface of the touch panel mounted on the display 110 corresponds to the input target surface.

In the present exemplary embodiment, the touch panel performs detection at a surface on which the operation object and the input target surface touch each other, and determines coordinates of a single point on this surface as the touch position. Also, in the proximity state, by using the detection method in which the detection sensitivity of the capacitance is increased, the touch panel detects the position of an operation object such as a finger being in proximity to the input target surface, and determines coordinates of a single point as the proximity position. At this time, the position detected in the touch state and the position detected in the proximity state are distinguished from each other, and the information processing apparatus 100 is notified of the position information from the touch panel together with information for identifying the touch state and the proximity state. In the present exemplary embodiment, the proximity sensor 109 does not detect the proximity position regarding the operation object touching the input target surface that is detected by the touch sensor 108. The proximity sensor 109 detects only the position information of a tip of the operation object (for example, a fingertip of a user) being in non-contact with the input target surface and in proximity to the input target surface which is close enough to allow the position information to be detected. Assume that the touch position detected by the touch sensor 108 is preferentially used in a case where the position of the operation object being in contact with the input target surface is also detectable by the proximity sensor 109 according to the configuration of the system and the sensor.

FIG. 1B is a block diagram illustrating an example of a functional configuration of the information processing apparatus 100 according to the present exemplary embodiment. In the present exemplary embodiment, an example will be described below in which one or more finger(s) of the user is (are) used as the operation object, but the same processing is performed even in a case where the user uses a stylus or the like.

First, the information processing apparatus 100 according to the present exemplary embodiment includes a touch position detection unit 121, a proximity position detection unit 122, a touch state acquisition unit 123, a proximity state acquisition unit 124, a recognition unit 125, and an output control unit 126. The CPU 102 loads the program stored in the ROM 103 into the RAM 104, and performs the processing according to each of flowcharts that will be described below, by which each of these functional units is realized. However, the present exemplary embodiment can also be similarly realized by an information processing apparatus including hardware constituted by calculation units and/or circuits corresponding to these functional units. Next, each of the components will be described.

The touch position detection unit 121 detects information of the position touched by the user based on a signal that the touch position detection unit 121 is notified of from the input interface 105. At this time, in the present exemplary embodiment, the input interface 105 refers to, at a predetermined time interval, the information of the touch position detected by the touch panel serving as the input unit, and sequentially notifies the touch position detection unit 121 of the signal every time the input interface 105 acquires the information of the touch position. The information of the touch position detected by the touch position detection unit 121 contains at least position information of a touch event. The touch event is information indicating a type of touch information that the touch position detection unit 121 is notified of. In the present exemplary embodiment, the touch position detection unit 121 is notified of an event "TOUCH" when being notified of the touch information according to the operation object newly touching the input target surface, or the operation object being continuously in contact with the input target surface. Further, the touch position detection unit 121 is notified of a touch event "RELEASE" when being notified of the touch information according to the operation object released from the touch panel. When the touch event is "TOUCH", the information that the touch position detection unit 121 is notified of contains the coordinate information indicating the position being touched by the operation object. When the touch event is "RELEASE", the information of the touch position is not detected since the operation object is not in contact with the input target surface. In the present exemplary embodiment, the information of the position detected by the touch position detection unit 121 further contains information indicating a time at which the touch position or the touch event has been detected, and an identification (ID) for identifying the touch position. As the ID, an identifier associated with the order in which touch positions have been detected is used, thereby facilitating management in a case where a plurality of touch positions is detected. Further, in the present exemplary embodiment, the touch position detection unit 121 can detect the latest information of the touch position based on the ID, and detect the movement of the touch position based on the detection of the touch position corresponding to the same ID at a different position from a previously detected position. However, the present exemplary embodiment may be applied to a detection system that provides a notification of a touch event "MOVE" at the time of notification of the touch information according to the detection of the touch position corresponding to the same ID at the different position from the previously detected position.

The proximity position detection unit 122 detects position information of the operation object being in proximity to the input target surface (corresponding to the surface of the touch panel) in a similar manner to the touch position detection unit 121. The proximity position detected at this time is represented as coordinates indicating the position of the tip of the operation object (for example, the fingertip of the user) in a two-dimensional plane in parallel with the input target surface. In the present exemplary embodiment, position information in the direction perpendicular to the input target surface (vertical direction) is not detected. Further, the proximity position is not detected regarding the operation object being in contact with the input target surface. However, when the notification of the touch event that is acquired by the touch position detection unit 121 indicates "RELEASE", the operation object is not in contact with the input target surface. Therefore, the proximity position may be detected by the proximity position detection unit 122 at a substantially same timing as the notification of the "RELEASE" event.

In the present exemplary embodiment, the contents of the information (e.g. the touch event, the ID, the coordinate information indicating the position, the detection time) reported by the touch position detection unit 121 and the proximity position detection unit 122 is standardized into the same format, is stored into the RAM 104, and then is processed. However, information indicating that the position is detected in the proximity state is added to the information reported by the proximity position detection unit 122. For example, a value of a proximity flag is set to "ON".

The touch state acquisition unit 123 acquires at least a movement distance of the operation object being in the touch state based on the touch position detected by the touch position detection unit 121. Besides that, the touch state acquisition unit 123 acquires information that becomes necessary according to the operation to be recognized, such as a movement speed and a movement direction of the operation object. The proximity state acquisition unit 124 acquires at least a movement distance of the operation object being in the proximity state, based on the proximity position detected by the proximity position detection unit 122. The proximity state acquisition unit 124 can also acquire information that becomes necessary according to the operation to be recognized, such as a movement speed and a movement direction of the operation object.

The recognition unit 125 identifies the input touch operation by determining whether the information acquired by the touch state acquisition unit 123 and the information acquired by the proximity state acquisition unit 124 satisfy predetermined conditions. For example, the recognition unit 125 determines whether the information input by the operation object satisfies a condition for a "tap", a "move" (an operation of sliding the operation object on the input target surface in an arbitrary direction), or a "flick" (an operation of releasing the finger from the input target surface while quickly moving the finger as if flicking the input target surface). Further, if the operation is a handwriting input operation of drawing a graphic or a character with a trail of the touch position, the recognition unit 125 identifies the operation based on a result of a comparison between the drawn trail and dictionary information prepared in advance or the like. In the following description, the first exemplary embodiment will be described assuming that the touch operation identified by the recognition unit 125 is a single-touch operation identified based on information regarding a single input position. Therefore, in the first exemplary embodiment, even when a plurality of input positions is detected by the touch sensor 108 and the proximity sensor 109, the recognition unit 125 recognizes the single-touch operation according to the processing that will be described below, using a single point detected earliest among them as the target. However, the information processing apparatus 100 may be configured to, only when the detected position information is a single point, perform the processing that will be described below, independently of when the detected position information is not a single point.

The output control unit 126 controls each of the functional units of the information processing apparatus 100 to respond to the input operation. In the present exemplary embodiment, the output control unit 126 at least generates a display image based on a content of the operation that the output control unit 126 is notified of from the recognition unit 125, and outputs the generated display image to the display 110 serving as the output unit.

Now, a problem arising when the touch operation is recognized by using only the information acquired in the state where the operation object is in contact with the input target surface will be described in more detail, taking the "flick" as an example. Conventionally, in many cases, the "flick" has been recognized when the operation satisfies the condition that the operation object is moved by a movement amount which is a predetermined threshold value or larger during a predetermined time period immediately before the operation object is released from the input target surface. One use example will be described in comparison between when the user releases the finger while quickly moving the finger after touching the display item on the display 110 with the finger, and when the user releases the finger without quickly moving the finger after touching the display item on the display 110 with the finger. When the finger is quickly moved immediately before being released, the "flick" is recognized according the quick movement. At this time, the display item touched before that is often displayed on the display 110 so as to continue an inertial movement according to the quick movement even after the touch is ended. On the other hand, when the finger is not moved quickly enough to satisfy the condition for the "flick" during the predetermined time period immediately before the finger is released, the "flick" is not recognized. When the "flick", which is performed together with the release of the finger, is not recognized, the inertial movement of the display item does not occur. In this manner, in many cases, a feedback provided to the user largely changes depending on whether the apparatus determines that the "flick" has been performed. For example, if the touch sensor 108 detects a small vibration of the finger when the finger is released, a value detected by the touch sensor 108 may satisfy the condition for the "flick" even though the user has no intention to quickly move the finger. In this case, the inertial movement of the display item occurs on the display 110 against the user's intention, which makes the user feel that this is a malfunction of the apparatus.

Similarly, if a small vibration of the finger that is detected by the touch sensor 108 immediately after the user's finger touches the display item is recognized as the movement of the finger, the operation is recognized as the "move" even though the user has an intention to input the "tap", resulting in the movement of the display item. This case also makes the user feel that this is a malfunction of the apparatus.

To solve the problem, in the present exemplary embodiment, an example will be described below, in which the conditions for both the detected position of a touch and the position information in the proximity state before or after the input of the touch are used in combination, thereby allowing the information processing apparatus 100 to recognize user inputs such as the "tap", the "move", and the "flick" while distinguishing them from one another. More specifically, the information processing apparatus 100 recognizes that the "move" has been started, if both the touch position immediately after the start of the touch, and the proximity position in the proximity state immediately before the touch are moved sufficiently to satisfy predetermined conditions. Further, the information processing apparatus 100 recognizes that the "flick" has been input, if the touch position immediately before the end of the touch, i.e., the touch position immediately before the operation object is released from the input target surface is moved quickly enough to satisfy a predetermined condition, and also the proximity position in the proximity state immediately after the release is sufficiently moved.

FIG. 2 is a flowchart illustrating an example of a flow of processing in which the information processing apparatus 100 determines the touch operation according to the present exemplary embodiment. The processing according to the flowchart illustrated in FIG. 2 is started in response to receiving a notification of the information of the touch position detected by the touch sensor 108 or the information of the proximity position detected by the proximity sensor 109 from the input interface 105. Further, this processing is also started in response to receiving a release notification from the input interface 105, indicating that the touch position detected by the touch sensor 108 or the proximity position detected by the proximity sensor 109 has become undetected. Notification of the information of the touch position or the release is provided when the latest status of the sensor 108 is referenced at a predetermined time interval.

First, in step S201, the touch position detection unit 121 detects the information of the touch position. If the touch event that the touch position detection unit 121 is notified of is "TOUCH", the information of the touch position contains at least the information of the touched position, and the detection time and the ID of the touch. Further, if the touch event that the touch position detection unit 121 is notified of is "RELEASE", the information of the touch position contains at least the ID of the touch position at which the operation object is released. The touch position detection unit 121 stores the detected information into the RAM 104. In the present exemplary embodiment, for each ID, at least information of the touch position detected for the first time, information of the touch position detected for the last time (latest detection information), and information of the touch position detected previous time are stored into the RAM 104. These information pieces are stored in order to obtain a movement distance from where the touch is started, and a movement distance from the touch position detected previously. Therefore, when the touch position detection unit 121 has detected the movement of the touch position corresponding to the already detected ID, the touch position detection unit 121 stores the information acquired from the most recent two times of detection, and sequentially deletes, from information pieces older than them, information other than the first detection information. However, the stored information is not limited thereto, and can be set according to a resource of the apparatus. For example, all information pieces from when the touch position corresponding to a certain ID is detected for the first time until the touch position becomes undetected (is released) may be stored. The touch position detection unit 121 does not detect the touch position in a state where no operation object is in contact with the input target surface, since the notification of the information of the touch position is not provided from the touch sensor 108 in this state.

Next, in step S202, the proximity position detection unit 122 detects the information of the proximity position. The information of the proximity position contains at least the position information, the detection time, and the ID as long as the proximity position is kept detected, similarly to the touch position. If the operation object is sufficiently away from the input target surface and the proximity position becomes undetected, the information of the proximity position contains at least the event indicating that the proximity position becomes undetected, and the ID. The proximity position detection unit 122 stores the detected information into the RAM 104. At this time, the proximity position detection unit 122 stores the information indicating that the position is detected in the proximity state, into the RAM 104 in addition to the ID, the coordinate information indicating the proximity position, the detection time, and the like. For example, the proximity flag is set to "ON". In step S202, the notification of the information of the proximity position is not provided from the proximity sensor 109, if no operation object is in proximity to the input target surface (including the state in which the operation object is in contact with the input target surface). Therefore, the proximity position detection unit 122 does not detect the proximity position, and the processing proceeds to step S203.

In step S203, the touch state acquisition unit 123 determines whether the touch position detection unit 121 has detected the touch position in step S201. For example, the touch state acquisition unit 123 makes this determination by referring to the information stored in the RAM 104. If the touch position detection unit 121 has detected the touch position (YES in step S203), the processing proceeds to step S204. On the other hand, if the touch position detection unit 121 has not detected the touch position (NO in step S203), the processing proceeds to step S205.

In step S204, the touch state acquisition unit 123 acquires information of the movement of the operation object with respect to the input unit, by using the information of the touch position detected by the touch position detection unit 121. For example, the touch state acquisition unit 123 acquires at least any of the movement distance, the movement speed, the movement direction, and the like. In the present exemplary embodiment, the touch state acquisition unit 123 measure and acquires the distance from the coordinate point at the time of when the touch position detection unit 121 has detected the touch of the operation object on the input unit for the first time, to the latest detected coordinate point.

On the other hand, in step S205, the proximity state acquisition unit 124 determines whether the proximity position detection unit 122 has detected the proximity position in step S202. Also at this time, the proximity state acquisition unit 124 makes the determination by referring to the information stored in the RAM 104. If the proximity position detection unit 122 has detected the proximity position (YES in step S205), the processing proceeds to step S206. On the other hand, if the proximity position detection unit 122 has not detected the proximity position (NO in step S205), the processing proceeds to step S208.

In step S206, the proximity state acquisition unit 124 acquires information of a movement of the operation object immediately before the touch, by using the information of the proximity position detected by the proximity position detection unit 122 in the proximity state immediately before the operation object touches the input unit. For example, the proximity state acquisition unit 124 acquires the movement distance, the movement speed, and the movement direction of the operation object. In the present exemplary embodiment, a case will be described in which the proximity state acquisition unit 124 acquires the movement distance. The proximity state acquisition unit 124 acquires the movement distance by measuring a movement distance from a coordinate point at the time of when the proximity position detection unit 122 has detected the entry of the operation object into proximity to the input unit for the first time, to the latest detected coordinate point. In the present exemplary embodiment, a method that references a flag is used as a method for determining whether the operation object is in a state before touching the input unit. For example, if the touch state acquisition unit 123 determines that the touch position has been detected in step S203 (YES in step S203), a touch flag is set to "ON", and is associated with the information stored in the RAM 104. If the touch flag is not set to "ON", the proximity state acquisition unit 124 can determine that the operation object has not touched the input unit yet.

In step S207, the proximity state acquisition unit 124 acquires information of a movement of the operation object immediately after the touch, by using the information of the proximity position detected by the proximity position detection unit 122 in the proximity state immediately after the operation object leaves from the input unit. Also at this time, for example, the proximity state acquisition unit 124 acquires the movement distance, the movement speed, and the movement direction of the operation object with respect to the input unit. In the present exemplary embodiment, the proximity state acquisition unit 124 acquires a movement distance from a coordinate point at the time of when the proximity position detection unit 122 has detected the proximity position for the first time after the operation unit leaves from the input unit and shifts to the proximity state, to the latest detected coordinate point. The proximity state acquisition unit 124 can determine whether the operation object is in a state after leaving from the input unit, based on the value of the touch flag, and can determine that the operation object has touched the input unit and then left from the input unit if the value of the touch flag is set to "ON".

On the other hand, in step S208, the information processing apparatus 100 initializes the information stored in the RAM 104, since both the touch position and the proximity position have not been detected, so that the current state is regarded as the state before or after the operation. In the present exemplary embodiment, the information processing apparatus 100 initializes the coordinate point at the start of the movement that is stored to acquire the movement distance, the current coordinate point, and the touch flag. However, for example, in a case where the information processing apparatus 100 is desired to recognize, for example, a type of operation in which one operation is constituted by a plurality of times of touches, initializing the information every time the operation object leaves from the input target surface may cause inconvenience. Therefore, the information processing apparatus 100 may initialize the result of the acquisition in step S208 only once immediately after the operation is identified, and keep the information stored without performing step S208 at a timing other than the above-described timing.

In step S209, the recognition unit 125 determines whether the "move" has been started, by referring to the touch state acquisition result acquired in step S204, the proximity state acquisition result acquired in step S206 and in step S207, and a dictionary prepared in advance. In the following description, processing for determining whether the "move" has been started will be referred to as a move determination. It is assumed here that the condition for the touch state and the condition for the proximity state are associated with the "move" in the dictionary. In the present step, the recognition unit 125 determines that the "move" has been started if the touch state acquisition result and the proximity state acquisition result satisfy the respective predetermined conditions set for them. The details of the move determination processing in step S209 will be described below.

In step S210, the recognition unit 125 determines whether the "flick" has been input, by referring to the touch state acquisition result acquired in step S204, the proximity state acquisition result acquired in step S206 and in step S207, and a dictionary prepared in advance. In the following description, processing for determining whether the "flick" has been input will be referred to as a flick determination. Similarly to step S209, the recognition unit 125 determines that the "flick" has been input if the touch state acquisition result and the proximity state acquisition result satisfy the respective predetermined conditions set for them. The details of the flick determination processing in step S210 will be described below.

Next, an example of a flow of the processing for determining the "move", which is performed in step S209 illustrated in FIG. 2, will be described with reference to a flowchart illustrated in FIG. 3.

In step S301, the recognition unit 125 determines whether the operation object is currently in contact with the input target surface. With respect to a method for this determination, the recognition unit 125 can make the determination by referring to the information of the touch position that is stored in the RAM 104. Alternatively, the result of the determination in step S203 may be stored as flag information or the like, and the recognition unit 125 may refer to this flag information. If the recognition unit 125 determines that the operation object is in contact with the input target surface at this time (YES in step S301), the processing proceeds to step S302. On the other hand, if the recognition unit 125 determines that the operation object is not in contact with the input target surface (NO in step S301), the processing proceeds to step S310.

In step S302, the recognition unit 125 determines whether a value of a move flag is set to "ON". The value of the move flag is set to "ON" and stored into the RAM 104, if the "move" is determined to have been started in the process of step S305, which is a later step. If the value of the move flag is set to "ON" at this time (YES in step S302), the processing proceeds to step S308. If the value of the move flag is set to "OFF" (NO in step S302), the processing proceeds to step S303.

In step S303, the recognition unit 125 determines whether the proximity state before the touch that has been acquired in step S206 satisfies a first condition. The first condition is a condition for determining whether the above-described operation object has been sufficiently moved in the direction in parallel with the input target surface while being in proximity to the input target surface before touching the input target surface. For example, the first condition is that the movement distance in the proximity state before the touch is longer than a preset distance threshold value T1. Here, the movement distance in the proximity state is the movement distance, in the direction in parallel with the input target surface, from the position of when the proximity position detection unit 122 starts to detect the proximity of the operation object before the touch to the last (latest) position detected in the proximity state before the touch. The movement distance exceeding the threshold value T1 means that the user "has brought the finger closer to the input target surface while moving the finger". Therefore, it is considered that the user is highly likely to have an intention to perform the "move" (the operation of moving the finger) before the touch. If the recognition unit 125 determines that the proximity state before the touch satisfies the first condition (YES in step S303), the processing proceeds to step S307. If the recognition unit 125 determines that the proximity state before the touch does not satisfy the first condition (NO in step S303), the processing proceeds to step S304.

In step S304, the recognition unit 125 determines whether the touch state acquired in step S204 satisfies a second condition. For example, the second condition is that the movement distance after the start of the touch is longer than a preset distance threshold value T2. The movement distance after the start of the touch is the distance from the touch position of when the touch position detection unit 121 has shifted from the state not detecting the touch of the operation object to the state detecting the touch of the operation object, to the latest (current) touch position. The threshold value T2 is a threshold value for determining whether the distance by which the operation object has moved in the touch state is long enough to be recognizable as the "move". In the present exemplary embodiment, in a case where the process of step S304 is performed, the first condition is not satisfied in step S303 and it is therefore considered that the "move" is less likely to be performed. Therefore, in the present exemplary embodiment, the second condition is set to a stricter condition than a condition (a third condition) to be used in a determination in step S307, which will be described below, if the proximity state before the touch satisfies the first condition in step S303 (YES in step S303). Therefore, a value of the threshold value T2 is larger than a distance threshold value to be used if the first condition is satisfied in step S303 (YES in step S303) so that it is considered that the "move" is highly likely to be performed. As a result, even when the operation object slightly vibrates after the touch or the detection of the touch position causes an error, it is less likely to recognize the touch as the "move". If the recognition unit 125 determines that the touch state satisfies the second condition (YES in step S304), the processing proceeds to step S305. If the recognition unit 125 determines that the touch state does not satisfy the second condition (NO in step S304), the present processing is ended, and the processing returns to the flowchart illustrated in FIG. 2.

In step S305, the recognition unit 125 sets the value of the move flag, which indicates that the "move" has been started, to "ON". In step S306, the recognition unit 125 notifies the output control unit 126 of the "move" event indicating that the "move" has been started.

On the other hand, in step S307, the recognition unit 125 determines whether the touch state acquired in step S204 satisfies the third condition. For example, the third condition is that the movement distance after the start of the touch is longer than the preset distance threshold value T3. Similarly to the threshold value T2, the threshold value T3 is a threshold value for determining whether the distance by which the operation object has moved in the touch state is long enough to be recognizable as the "move". The process of step S307 is performed if the proximity state before the touch satisfies the first condition in step S303 (YES in step S303) so that it is considered that the "move" is highly likely to be performed. Therefore, the third condition is set to a condition that can be more easily satisfied than the above-described second condition. In other words, the threshold value T3 is set to a smaller value than the threshold value T2. As a result, when the user moves the operation object (e.g. the finger) after the touch, the start of the "move" is promptly recognized, thereby improving followability to the user's "move". If the recognition unit 125 determines that the touch state satisfies the third condition (YES in step S307), the processing proceeds to step S305. If the recognition unit 125 determines that the touch state does not satisfy the third condition (NO in step S307), the present processing is ended, and the processing returns to the flowchart illustrated in FIG. 2.

In this manner, the processing according to the present exemplary embodiment includes the two processing flows before the "move" is determined to have been started in step S305. The first flow is that, although the proximity state before the touch does not satisfy the first condition in step S303 so that it is considered that the "move" is less likely to be input, in step S304, the movement distance in the touched state exceeds the distance threshold value T2 that is set to be sufficiently large. The second flow is that the proximity state before the touch satisfies the first condition in step S303 so that it is considered that the "move" is highly likely to be input, and then the movement distance in the touched state exceeds the threshold value T3 for the "move" in step S307. If the process of step S302 is performed with the value of the move flag set to "ON" according to any of these flows (YES in step S302), the processing proceeds to step S308.

In step S308, the recognition unit 125 determines whether the touch state acquired in step S204 satisfies a fourth condition. For example, the coordinate point during the touch has been previously stored, and the fourth condition is that the movement distance from the coordinate point stored last time to the current coordinate point is longer than a preset distance threshold value T4. Similarly to the threshold values T2 and T3, the threshold value T4 is a threshold value for determining whether the distance by which the operation object has moved in the touch state is long enough to be recognizable as the "move". However, the above-described second condition and third condition are the conditions for determining whether the "move" has been started regarding the touch position immediately after the start of the touch. On the other hand, the fourth condition is a condition for determining whether the "move", which has been already started, continues. Therefore, in the present exemplary embodiment, the fourth condition is set to a condition that can be more easily satisfied than the threshold value of the above-described second condition. In other words, the distance threshold value T4 is set to be smaller than the threshold value T2. As a result, when the "move" has already been started, only a slight movement is promptly recognized as the "move" unless the operation object is released, which can thereby improve the followability to the user's "move". If the recognition unit 125 determines that the touch state satisfies the fourth condition (YES in step S308), the processing proceeds to step S309. If the recognition unit 125 determines that the touch state does not satisfy the fourth condition (NO in step S308), the present processing is ended, and the processing returns to the flowchart illustrated in FIG. 2.

In step S309, the recognition unit 125 notifies the output control unit 126 of the "move" event indicating that the "move" has been performed.

In step S310, the recognition unit 125 sets the value of the move flag to "OFF". This is because the recognition unit 125 does not need to perform the move determination since the touch operation is not in progress if the recognition unit 125 determines that the operation object is not in contact with the input target surface in step S301 (NO in step S301).

This is the processing for determining the "move", which is performed in step S209. In the example of the flowchart illustrated in FIG. 3, the recognition unit 125 selects based on the result in step S303 which condition to use as the condition for the touch determination, the second condition or the third condition, in order to further increase accuracy of the determination. However, this processing can also be modified in such a manner that, for example, step S304 is omitted, and the output control unit 126 is notified of the "move" event if the first condition is satisfied in step S303 (YES in step S303) and if the third condition is satisfied in step S307 (YES in step S307) to simplify the processing.

Figure 4:
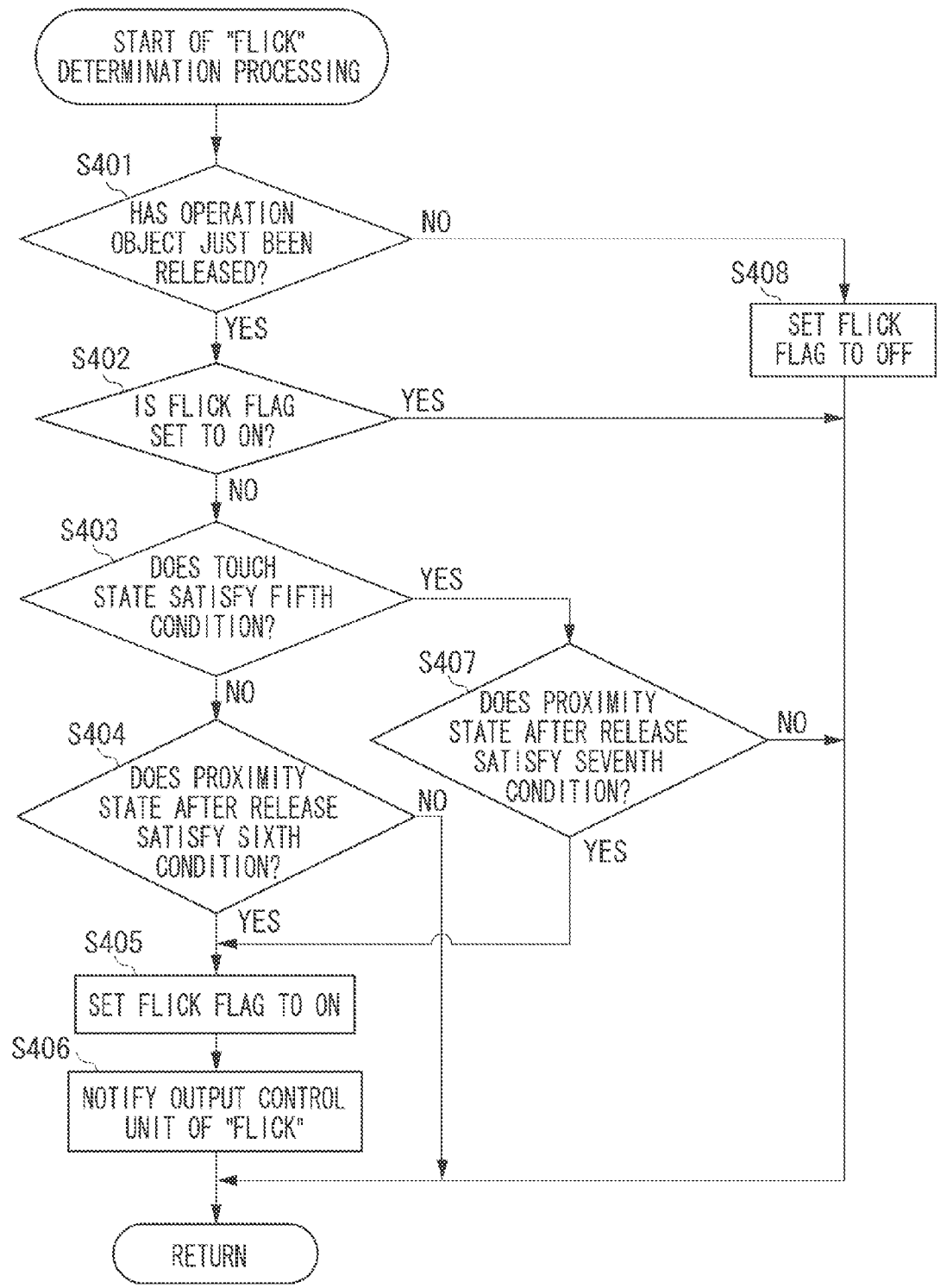
FIG. 4 is a flowchart illustrating an example of a flow of processing for determining a "flick".

Next, an example of a flow of the processing for determining the "flick", which is performed in step S210, will be described with reference to a flowchart illustrated in FIG. 4.

In step S401, the recognition unit 125 determines whether the operation object has just been released. In the present exemplary embodiment, the recognition unit 125 determines whether, immediately before the present, there has been a change from the state in which the touch position detection unit 121 detects the touch position to the state in which the touch position detection unit 121 does not detect the touch position, by referring to the information of the series of movements of the operation object that is stored in the RAM 104. As another method for this determination, for example, the recognition unit 125 can also use a post-release flag, which is set to "ON" upon occurrence of the change from the state in which the touch position detection unit 121 detects the touch position to the state in which the touch position detection unit 121 does not detect the touch position. In this case, a value of the post-release flag is set to "OFF" if the touch position detection unit 121 detects the touch position again. In either method, in the present exemplary embodiment, the recognition unit 125 determines whether the operation object has just been released from the touch panel. However, the length of time elapsed after the release, during which the recognition unit 125 determines that "the operation object has just been released" may be set according to a command to be recognized and a specification of the apparatus. If the recognition unit 125 determines that the operation object has just been released (YES in step S401), the processing proceeds to step S402. On the other hand, if the recognition unit 125 determines that the operation object has not just been released (NO in step S401), the processing proceeds to step S408.

In step S402, the recognition unit 125 determines whether a value of a flick flag is set to "ON". The value of the flick flag is set to "ON" and stored into the RAM 104, if the "flick" is determined to have been performed in the process of step S405, which is a later step. If the value of the flick flag is set to "ON" at this time (YES in step S402), the present processing is ended, and the processing returns to the flowchart illustrated in FIG. 2. On the other hand, if the value of the flick flag is set to "OFF" (NO in step S402), the processing proceeds to step S403.

In step S403, the recognition unit 125 determines whether the touch state acquired in step S204 satisfies a fifth condition. The fifth condition is a condition set to determine whether the operation object has been released according to the definition of the "flick". In other words, the fifth condition is a condition for determining whether the operation object has been released while being moved more quickly than a predetermined speed as if flicking the input target surface. For example, the fifth condition is that the movement speed of the operation object immediately before the release is higher than a preset speed threshold value T5. The movement speed immediately before the release is a value acquired by dividing a distance from a coordinate point indicating a touch position detected by the touch position detection unit 121 immediately before the release to a coordinate point detected as being touched predetermined time before that, by this predetermined time. However, as a modification example of the present exemplary embodiment, it is also possible to omit the processing that acquires the value of the speed by dividing the distance by the time. More specifically, the flick determination can also be performed by processing that compares a length of a movement distance itself during a predetermined time period set to a fixed value, and a threshold value T5' set as a movement distance. In the present exemplary embodiment, it is considered that "flick" is highly likely to have been performed if the movement speed immediately before the release exceeds the threshold value T5. If the movement speed immediately before the release is higher than the preset threshold value T5 (YES in step S403), the processing proceeds to step S407. If the movement speed immediately before the release is the preset threshold value T5 or lower (NO in step S403), the processing proceeds to step S404.

In step S404, the recognition unit 125 determines whether the proximity state after the release that has been acquired in step S207 satisfies a sixth condition. For example, the sixth condition is that the movement distance in the proximity state after the release is longer than a preset distance threshold value T6. The movement distance in the proximity state at this time is the distance by which the proximity position is moved in the direction in parallel with the input target surface during a period from when the proximity position detection unit 122 detects the proximity of the operation object for the first time immediately after the release up to the present time. The movement distance exceeding the threshold value T6 indicates that the user has moved the operation object such as the finger by a long distance in the direction in parallel with the input target surface continuously even after the release while maintaining momentum of the "flick". In other words, it can be considered that the "flick" is highly likely to have been performed. In the present exemplary embodiment, in a case where the process of step S404 is performed, this means the dissatisfaction of the fifth condition in step S403 so that it is considered that the "flick" is less likely to have been input. Therefore, in the present exemplary embodiment, the sixth condition is set to a stricter condition than a seventh condition to be used for a determination in step S407 (described below) if the touch state satisfies the fifth condition in step S403 (YES in step S403). Therefore, a value of the distance threshold value T6 is larger than a threshold value to be used if the fifth condition is satisfied in step S403 (YES in step S403) so that it is considered that the "flick" is highly likely to have been performed. If the touch state does not satisfy the fifth condition in step S403 (NO in step S403), the "flick" is less likely to have been performed. Therefore, in step S404, the threshold value for the flick determination is set to be large to reduce misrecognition of the "flick". If the movement distance is longer than the preset distance threshold value T6 (YES in step S404), the processing proceeds to step S405. If the movement distance is the preset distance threshold value T6 or shorter (NO in step S404), the present processing is ended, and the processing returns to the flowchart illustrated in FIG. 2.

In step S405, the recognition unit 125 sets the value of the flick flag, which indicates that the "flick" has been input, to "ON". In step S406, the recognition unit 125 notifies the output control unit 126 of the "flick" event indicating that the "flick" has been performed.

In step S407, the recognition unit 125 determines whether the proximity state after the release that has been acquired in step S207 satisfies the seventh condition. For example, the seventh condition is that the movement distance in the proximity state after the release is longer than the preset distance threshold value T7. The seventh condition is set to a condition that can be more easily satisfied than the above-described sixth condition. In other words, the threshold value T7 is set to be smaller than the threshold value T6. The process of step S407 is performed in a situation where it is already considered that the "flick" is highly likely to have been performed, since the touch state satisfies the fifth condition in step S403 (YES in step S403). Therefore, the threshold value T7 for the flick determination is set to be small to prioritize followability to the user's "flick". Since the threshold value T7 for the flick determination is small, the seventh condition is easily satisfied even with a slight movement of the operation object such as the finger after the release. As a result, the input of the "flick" can be promptly recognized after the release. If the movement distance is longer than the preset threshold value T7 (YES in step S407), the processing proceeds to step S405. If the movement distance is the preset threshold value T7 or shorter (NO in step S407), the present processing is ended, and the processing returns to the flowchart illustrated in FIG. 2.

In the present exemplary embodiment, the processing includes the two flows before reaching step S405. The first flow is that the fifth condition set for the touch state is not satisfied (NO in step S403). In other words, in this flow, although it is considered that the "flick" is less likely to be input, the sixth condition set for the proximity state after the touch is satisfied (YES in step S404). The second flow is that the fifth condition set for the touch state is satisfied (YES in step S403). In other words, in the second flow, it is considered that the "flick" is highly likely to be input and then the seventh condition set for the proximity state after the touch is satisfied (YES in step S407). If the process of step S402 is performed with the value of the flick flag set to "ON" according to any of these flows (YES in step S402), the processing according to the flowchart illustrated in FIG. 4 is ended, and the processing returns to the main processing illustrated in FIG. 2.

In step S408, the recognition unit 125 sets the value of the flick flag to "OFF". This is because the recognition unit 125 does not need to perform the flick determination if the recognition unit 125 determines that the operation object has not just been released in step S401 (NO in step S401).

This is the processing for determining the "flick", which is performed in step S210. In the example illustrated in FIG. 4, the recognition unit 125 selects based on the result in step S403 which condition to use as the condition for the flick determination, the sixth condition or the seventh condition, in order to further increase accuracy of the determination. However, for example, this processing can also be modified in such a manner that, for example, step S404 is omitted to simplify the processing. In this case, the output control unit 126 is notified of the "flick" event if the condition in step S403 is satisfied (YES in step S403) and if the condition in step S407 is satisfied (YES in step S407).

The "move" determined in step S209, and the "flick" determined in step S210, which are described above, are an example of a plurality of operations interpreted as different operations according to whether there is a movement of the touch position at a specific timing. In a case where the operations to be distinguished from one another are different from this example, determinations may be made based on conditions set according to those operations. Further, in the present exemplary embodiment, the two kinds of processing, the move determination and the flick determination are performed, but the determination made therein is not limited to this example. The number of operations to be determined may be increased or reduced, and the operation(s) may be replaced. Further, in the present exemplary embodiment, an example has been described in which the determination about the individual operation is made in the later step in the touch operation determination processing according to the flowchart illustrated in FIG. 2, but the timing of the determination about the individual operation is not limited to this example. For example, the determination about whether the operation object is in contact with the input target surface (step S301), and the release determination (step S401) may be integrated into steps S203 and S205 illustrated in FIG. 2, thereby being performed in earlier steps in the flowchart illustrated in FIG. 2. In this case, the number of steps in the processing can be reduced, because the move determination processing and the flick determination processing are not called at a timing that does not require the determination. However, the determination about the individual operation can be easily added and removed in the program by separating the processing for acquiring the touch state and the proximity state and the later processing for determining the operation from each other, as in the present exemplary embodiment. Further, this separation can weaken a dependency relationship between the processing procedures for determining the operation, thereby improving maintainability.

In the above-described manner, the information processing apparatus 100 according to the present exemplary embodiment recognizes the input touch operation based on the conditions for both the detected position of a touch and the position information in the proximity state before or after the input of the touch. This can reduce the occurrence of misrecognition against the user's intention.

Operation Example 1

In the following description, a specific operation performed when the user operates the information processing apparatus 100 according to the first exemplary embodiment will be described as an operation example.

Figure 5:
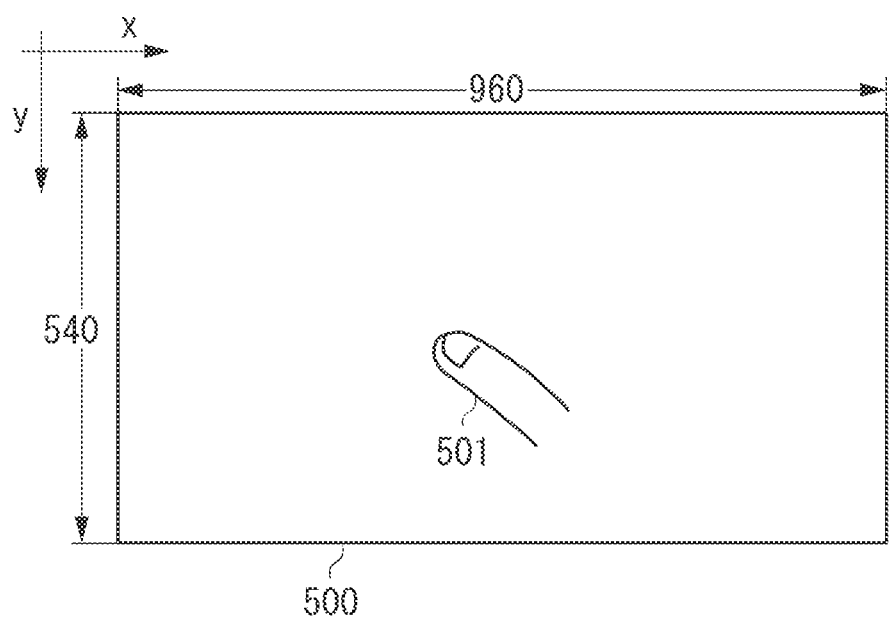
FIG. 5 illustrates an example of a relationship between a touch panel and a coordinate plane used in an operation example.

First, FIG. 5 illustrates an example of the touch panel used in the present exemplary embodiment. Assuming that an input region 500 on the surface of the touch panel is a coordinate plane including a width of 960 dots and a width of 540 dots in an x axis direction and a y axis direction, respectively, with an origin thereof set at an upper left point as viewed in FIG. 5, the touch position and the proximity position are treated as coordinate information thereon. Assume that a resolution of the touch panel matches the display 110, and "dot" is used as a unit of the coordinate value. Assume that the information processing apparatus 100 is notified of the detected information of the touch position and the proximity position from the input interface 105 every 20 milliseconds (ms). The input region 500 may be the entire surface of the touch panel serving as the input target surface, or may be a partial section in the input target surface. A user's finger 501 serving as the operation object inputs the "move" or the "tap" onto the input region 500. In the present exemplary embodiment, the term "tap" is used to refer to a "single tap" in which tapping the input region 500 once is recognized as an operation input.

First, the following describes an example of determining whether the "move" has been started in the following two cases: a case where the user's finger 501 is moved by a predetermined distance or longer in the direction in parallel with the input target surface in the proximity state immediately before the user's finger 501 touches the input target surface, and a case where the user's finger 501 is not moved by the predetermined distance or longer in the direction in parallel with the input target surface in the proximity state immediately before the user's finger 501 touches the input target surface. FIGS. 6A and 6B illustrate a comparison between when the user's finger 501 starts inputting the "move", and when the user's finger 501 starts inputting the "tap". Each of FIGS. 6A to 6D corresponds to the vicinity of the finger 501 illustrated in FIG. 5 as viewed from the direction along the y axis.

In FIG. 6A, individual points 511 to 517 are a series of input positions detected when the user's finger 501 starts inputting the "move". Each of the points 511 to 517 is defined by xy coordinates based on the coordinate plane illustrated in FIG. 5. In this case, the points 511 to 514 are the proximity positions detected by the proximity sensor 109, and the points 515 to 517 are the touch positions detected by the touch sensor 108.

Further, in FIG. 6B, individual points 521 to 524 are a series of input positions detected before the user's finger 501 touches the touch panel when the user's finger 501 performs the "tap", i.e., does not start the "move". In this case, the points 521 and 522 are the proximity positions detected by the proximity sensor 109, and the points 523 and 524 are the touch positions detected by the touch sensor 108.

First, processing performed by the information processing apparatus 100 according to the present exemplary embodiment when the user starts the "move" will be described with reference to FIG. 6A. The proximity sensor 109 first detects the point 511 as the proximity position when the finger 501 has entered a proximity range of the input target surface. The processing according to the flowchart illustrated in FIG. 2 is started in response to the proximity position being detected. At the time of the detection of the point 511, no touch position is detected since the finger 501 is still in the state before the touch at this time (NO in step S203). On the other hand, the point 511 as the proximity position is detected (YES in step S205). However, at this time, only a single piece of the information of the proximity position has been stored and the finger 501 has not touched the input target surface yet. Therefore, in steps S206 and S207, the proximity state acquisition unit 124 does not acquire the movement distance in the proximity state before the touch and the movement distance in the proximity state after the release, and the processing proceeds to the next process. At this stage, the move flag and the flick flag are each kept set to "OFF", which is an initial value. Therefore, in steps S209 and S210, results of both the move determination and the flick determination are "NO", and then the processing according to the flowchart illustrated in FIG. 2 is ended. After that, the processing according to the flowchart illustrated in FIG. 2 is repeated in a similar manner, every time each of the points 512 to 517 is detected.

When the point 512 has been detected by the proximity sensor 109, then in step S206, the proximity state acquisition unit 124 acquires the movement distance in the proximity state before the touch, based on a difference from the position information of the point 511 detected and stored first. In the operation example 1, a straight-line distance between the point 511 and the point 512 is calculated and determined to be approximately 8.2 dots. However, the method for acquiring the movement distance is not limited to the calculation of the straight-line distance between two points. For example, the difference may be calculated in each of the x axis direction and the y axis direction. In step S207, the proximity state acquisition unit 124 does not acquire the movement distance in the proximity state after the release, similarly to the processing at the time of the detection of the point 511. Then, in steps S209 and S210, results of both the move determination and the flick determination are "NO", and then the processing according to the flowchart illustrated in FIG. 2 is ended. The proximity state acquisition unit 124 acquires a movement distance from the point 511 to the latest point by using similar processing to the processing at the time of the point 512 every time each of the points 513 and 514 has been detected as the proximity position. In the example illustrated in FIG. 6A, at the time of the detection of the point 514, the movement distance from the first point is calculated and determined to be approximately 32.0 dots.

Next, the point 515 is detected by the touch sensor 108. At this time, the touch position has been detected (YES in step S203), but only a single piece of the information of the touch position has been stored. Therefore, in step S204, the touch state acquisition unit 123 does not acquire the movement distance in the touch state, and the processing proceeds to the move determination processing. At this time, the operation object is in contact with the input target surface (YES in step S301). Since the move flag is set to "OFF" (NO in step S302), then in step S303, the recognition unit 125 determines whether the proximity state before the touch satisfies the first condition. In the operation example 1, it is assumed that the first condition is that "the movement distance in the proximity state before the touch is the threshold value T1=30 dots or larger". In the example illustrated in FIG. 6A, the movement distance in the proximity state before the touch is approximately 32.0 dots, and thus satisfies the threshold value T1 (30 dots or larger) (YES in step S303). However, the movement distance in the touch state has not been calculated yet. Therefore, the recognition unit 125 determines that the touch state does not satisfy the third condition (NO in step S307), and then the processing returns to the flowchart illustrated in FIG. 2. In step S210, the flick determination result is "NO" since the flick flag is set to "OFF", and then the processing according to the flowchart illustrated in FIG. 2 is ended.

Next, when the point 516 has been detected by the touch sensor 108, then in step S204, the touch state acquisition unit 123 acquires the movement distance in the touch state based on a difference from the position information of the point 515 detected and stored last time. In the operation example 1, the movement distance is acquired by calculating the straight-line distance, similarly to the case of the proximity state. In the example illustrated in FIG. 6A, a movement distance from the point 515 to the point 516 is determined to be approximately 20.0 dots. In step S209, the move determination is performed. Then, in step S303, the proximity state before the touch satisfies the first condition, similarly to the determination at the time of the point 515. Then, in step S307, the recognition unit 125 determines whether the movement distance in the touch state satisfies the third condition. It is assumed here that the third condition is that "the movement distance in the touch state is the threshold value T3=10 dots or larger". The movement distance from the point 515 to the point 516 is approximately 20.0 dots, and thus satisfies the third condition (YES in step S307). Therefore, the recognition unit 125 sets the move flag to "ON", and the other modules of the information processing apparatus 100 such as the output control unit 126 are notified of the "move" event.

When the point 517 has been detected by the touch sensor 108, the processing before reaching the move determination is performed according to a similar flow to the processing in the case of the point 516. In step S204, a movement distance from the point 516 to the point 517 is calculated and determined to be 23 dots. Further, the movement speed is calculated by dividing 23 dots by a cycle (for example, 20 ms) from the position detection performed last time to the current position detection. In the move determination, since the move flag is set to "ON" (YES in step S302), then in step S308, the recognition unit 125 determines whether the movement distance from the touch position detected last time satisfies the fourth condition. If it is assumed here that the fourth condition is that "the movement distance from the touch position detected last time is the threshold value T4=1 dot or larger", the movement distance from the point 516 to the point 517 is 23 dots, and thus satisfies the fourth condition. Therefore, in step S309, the output control unit 126 is notified of the "move" event.

In this manner, in the present exemplary embodiment, if the user has already started moving the finger 501 in the proximity state before touching the touch panel with the finger 501, the information processing apparatus 100 reduces the threshold value for the movement distance in the touch state, and therefore can promptly respond when the "move" is input. As a result, the operability can be improved from the user's point of view.

Next, processing performed by the information processing apparatus 100 according to the present exemplary embodiment when the user starts the "tap" will be described with reference to FIG. 6B. FIG. 6B does not illustrate a position detected when the finger 501 is released. Only based on these information pieces, which operation is to be finally input, the "tap", the "move", or the "flick" cannot be determined.

Also in the case of the example illustrated in FIG. 6B, the processing according to the flowchart illustrated in FIG. 2 is repeated every time each of the points 521 to 524 is detected. Processing to performed when the points 521 and 522 are detected by the proximate sensor 109 is in accordance with a similar flow to that for the points 511 to 514 illustrated in FIG. 6A. In the case of FIG. 6B, a movement distance from the point 521 to the point 522 is calculated and determined to be approximately 5.8 dots.

Subsequently, the point 523 is detected by the touch sensor 108. At this time, the touch position has been detected (YES in step S203), but only a single piece of the information of the touch position has been stored. Therefore, in step S204, the touch state acquisition unit 123 does not acquire the movement distance in the touch state, and the processing proceeds to the move determination processing. At this time, the operation object is in contact with the input target surface (YES in step S301). Since the move flag is set to "OFF" (NO in step S302), then in step S303, the recognition unit 125 determines whether the proximity state before the touch satisfies the first condition. In the operation example 1, the threshold value T1 for the first condition is 30 dots. In the case of the example illustrated in FIG. 6B, the movement distance from the point 521 to the point 522 is approximately 5.8 dots and is shorter than the threshold value T1, and thus does not satisfy the first condition (NO in step S303). However, since the movement distance in the touch state has not been calculated yet, the recognition unit 125 determines that the touch state does not satisfy the second condition (NO in step S304). Then, the processing returns to the processing according to the flowchart illustrated in FIG. 2. In step S210, the flick determination result is "NO".

When the point 524 has been detected by the touch sensor 108, then in step S204, the touch state acquisition unit 123 acquires the movement distance in the touch state based on a difference from the position information of the point 523 detected and stored last time. A movement distance from the point 523 to the point 524 is approximately 15.0 dots. In the move determination processing in step S209, since the proximity state before the touch does not satisfy the first condition (NO in step S303), then in step S304, the recognition unit 125 determines whether the movement distance in the touch state satisfies the second condition. In the operation example 1, it is assumed that the second condition is that "the movement distance in the touch state is the threshold value T2=30 dots or larger". In this manner, the threshold value T2 is set to be larger than 10 dots set as the threshold value T3. The movement distance from the point 523 to the point 524, which is approximately 15.0 dots, is shorter than 30 dots set as the threshold value T2, and thus does not satisfy the second condition (NO in step S304). Therefore, the output control unit 126 is not notified of the "move" event. The processing returns to the flowchart illustrated in FIG. 2, and then is ended.

In this manner, according to the present exemplary embodiment, if the user has not moved the finger 501 so much in the proximity state before touching the touch panel with the finger 501, the threshold value for the movement distance in the touch state is set to be relatively large. This makes it difficult to recognize that the "move" has been performed, and can thereby prevent the information processing apparatus 100 from incorrectly recognizing the "move" due to a variation in the position information detected by the touch sensor 108 in a case where the user has no intention to perform the "move".

Next, FIGS. 6C and 6D illustrate a comparison between when the user performs the "flick" when releasing the finger 501 to end the "move", and when the user does not perform the "flick" when releasing the finger 501 to end the "move".

In FIG. 6C, individual points 601 to 606 are a series of input positions detected before the user's finger 501 is moved away from the touch panel and exits the proximity range of the input target surface after being released while being slid as the "flick" in the middle of the "move". Each of the points 601 to 606 is defined by xy coordinates based on the coordinate plane illustrated in FIG. 5. In this case, the points 601 and 602 are the touch positions detected by the touch sensor 108, and the points 603 to 606 are the proximity positions detected by the proximity sensor 109. Similarly, in FIG. 6D, individual points 611 to 615 are a series of input positions detected before the user's finger 501 is moved away from the touch panel and exits the proximity range of the input target surface after being released without the "flick" being performed in the middle of the "move". In this case, the points 611 and 612 are the touch positions detected by the touch sensor 108, and the points 613 to 615 are the proximity positions detected by the proximity sensor 109.

First, processing performed by the information processing apparatus 100 according to the present exemplary embodiment in the course of the user's releasing the finger 501 while performing the "flick" after the "move" will be described with reference to FIG. 6C. Also in this case, the processing according to the flowchart illustrated in FIG. 2 is repeated every time each of the points 601 to 606 is detected. The points 601 and 602 are the touch positions, more specifically, the touch positions at which the touch sensor 108 detects the finger 501 performing the "move". Before the processing reaches this stage, in step S308, the move determination using the movement distance in the touch state and the fourth condition has been performed, as in the description of the point 517 illustrated in FIG. 6A.

When the point 602 has been detected by the sensor 108, then in step S204, the touch state acquisition unit 123 acquires the movement distance and the movement speed in the touch state based on a difference from the position information of the point 601 detected and stored last time. A movement distance from the point 601 to the point 602 is approximately 28.0 dots. If 20 ms is set as the time interval at which the touch position is detected, the movement speed is calculated and determined to be approximately 1.4 dots/ms. Further, the move flag is set to "ON" (YES in step S302), and the movement distance from the touch position detected last time, which is approximately 28.0 dots, satisfies the fourth condition (YES in step S308). Therefore, in step S309, the output control unit 126 is notified of the "move" event. The movement speed may be calculated every time the touch position is detected. Alternatively, the information processing apparatus 100 may be configured to calculate the movement speed between the touch point detected immediately before the release, and the touch point detected immediately before that detection, at the time of detecting the release of the touch.

Next, the point 603 is detected by the proximity sensor 109. At this time, the touch position is not detected (NO in step S203), and the proximity position is detected (YES in step S205). The proximity state at this time corresponds to the proximity state after the release. Therefore, in step S206, the proximity state acquisition unit 124 does not acquire the movement distance in the proximity state before the touch, and in step S207, the proximity state acquisition unit 124 acquires the movement distance in the proximity state after the release. However, since only a single piece of the position information has been stored regarding the proximity state after the release, the proximity state acquisition unit 124 does not acquire the movement distance at this time. In the move determination in step S209, since the operation object is not in contact with the input target surface (NO in step S301), in step S310, the recognition unit 125 sets the move flag to "OFF". Then, the processing proceeds to the flick determination in step S210. In the flick determination, since the operation object has just been released at this time (YES in step S401) and the flick flag is set to the initial value "OFF" (NO in step S402), then in step S403, the recognition unit 125 determines whether the movement speed in the touch state immediately before the release satisfies the fifth condition. In the operation example 1, it is assumed that the fifth condition is that "the movement speed between the touch point detected immediately before the release, and the touch point detected immediately before that detection is the threshold value T5=1 dot/ms or larger". In this case, in the example illustrated in FIG. 6C, the movement speed is calculated and determined to be approximately 1.4 dots/ms, and thus satisfies the fifth condition (YES in step S403). Since the proximity state acquisition unit 124 has not yet acquired the movement distance in the proximity state after the release at this time, the recognition unit 125 determines that the movement distance in the proximity state after the release does not satisfy the seventh condition (NO in step S407).

Next, in the processing according to the detection of the point 604 by the proximity sensor 109, in step S207, a movement distance from the point 603 to the point 604 in the proximity state after the release is calculated and determined to be approximately 25.0 dots. In the flick determination, since the movement speed in the touch state before the release, which is approximately 1.4 dots/ms, satisfies the fifth condition (YES in step S403), in step S407, the recognition unit 125 determines whether the movement distance in the proximity state after the release satisfies the seventh condition. in the operation example 1, it is assumed that the seventh condition is that "the movement distance in the proximity state after the release is the threshold value T7=40 dots or larger". The movement distance from the point 603 to the point 604 is approximately 25.0 dots, and does not satisfy the seventh condition (NO in step S407). Therefore, the output control unit 126 is not notified of the "flick" event, and the processing according to the flowchart illustrated in FIG. 2 is ended.

Next, when the point 605 has been detected by the proximity sensor 109, the processing before the flick determination is performed according to a similar flow to that of the processing in the case of the point 604. However, regarding the proximity state after the release, in step S207, a movement distance from the point 603 to the point 605 is calculated and determined to be approximately 43.0 dots. In the flick determination, the movement distance from the point 603 to the point 605, which is approximately 43.0 dots, satisfies the seventh condition (YES in step S407). Therefore, in step S405, the recognition unit 125 sets the value of the flick flag to "ON", and in step S406, the output control unit 126 is notified of the "flick" event. Further, when the point 606 has been detected by the proximity sensor 109, the processing is ended without the output control unit 126 being notified of the "flick" event since the flick flag is set to "ON" (YES in step S402). In this manner, using the flag can prevent the output control unit 126 from being notified of the "flick" event a plurality of times and performing unnecessary display control even when the finger 501 is kept detected by the proximity sensor 109.

Generally, it is difficult to suddenly stop the operation object in quick motion against the inertia. Therefore, it is unnatural that the operation object is suddenly stopped immediately after the "flick" is input, and it is natural that the operation object is moved to a certain degree while maintaining the momentum of the "flick" even after being released. Therefore, in the present exemplary embodiment, if the user has released the finger 501 while quickly moving the finger 501, the information processing apparatus 100 recognizes that the "flick" has been input, at the stage where the user continues moving the finger 501 while maintaining the momentum of the "flick", based on the movement distance after the release. This allows the information processing apparatus 100 to determine that the user has performed the "flick" with higher reliability, thereby achieving the reduction of the occurrence of misrecognition.

Next, processing performed by the information processing apparatus 100 according to the present exemplary embodiment in the course of the user's releasing the finger 501 without performing the "flick" after the "move" will be described with reference to FIG. 6D. Also in this case, the processing according to the flowchart illustrated in FIG. 2 is repeated ever time each of the points 611 to 615 is detected. The points 611 and 612 are the touch positions, more specifically, the touch positions at which the touch sensor 108 detects the finger 501 performing the "move". Before the processing reaches this stage, in step S308, the move determination using the movement distance in the touch state and the fourth condition has been performed.

When the point 612 has been detected by the touch sensor 108, then in step S204, the touch state acquisition unit 123 acquires the movement distance and the movement speed in the touch state based on a difference from the position information of the point 611 detected and stored last time. A movement distance from the point 611 to the point 612 is approximately 12.2 dots. Here, if 20 ms is set as the time interval at which the touch position is detected, the movement speed is calculated and determined to be approximately 0.6 dots/ms.

Next, the point 613 is detected by the proximity sensor 109. Then, in step S209, the move determination is performed. In the move determination at this time, in step S310, the recognition unit 125 sets the move flag to "OFF", similarly to the processing in the case of the point 603. In the flick determination in step S210, since the operation object has just been released (YES in step S401) and the flick flag is set to the initial value "OFF" (NO in step S402), then in step S403, the recognition unit 125 determines whether the movement speed in the touch state immediately before the release satisfies the fifth condition. The movement speed from the point 611 to the point 612, which is approximately 0.6 dots/ms, is lower than the threshold value T5=1 dot/ms, and thus does not satisfy the fifth condition (NO in step S403). Further, since the proximity state acquisition unit 124 has not yet acquired the movement distance in the proximity state after the release, the recognition unit 125 determines that the movement speed in the proximity state after the release does not satisfy the sixth condition (NO in step S404).

Next, in the processing according to the detection of the point 614 by the proximity sensor 109, in step S207, a movement distance from the point 613 to the point 614 in the proximity state after the release is calculated and determined to be approximately 10.0 dots. In the flick determination, since the movement speed in the touch state before the release, which is approximately 0.6 dots/ms, does not satisfy the fifth condition (NO in step S403), then in step S404, the recognition unit 125 determines whether the movement distance from the point 613 to the point 614, which is approximately 10.0 dots, satisfies the sixth condition. In the operation example 1, it is assumed that the sixth condition is that "the movement distance in the proximity state after the release is the threshold value T6=60 dots or larger". The threshold value T6=60 dots for the sixth condition is set to be larger than the threshold value T7=40 dots for the seventh condition. At this time, the movement distance from the point 613 to the point 614, which is approximately 10.0 dots, does not satisfy the sixth condition (NO in step S404). Therefore, the output control unit 126 is not notified of the "flick" event, and the processing according to the flowchart illustrated in FIG. 2 is ended.

In the processing according to the detection of the point 615 by the proximity sensor 109, in step S207, a movement distance from the point 613 to the point 615 is calculated and determined to be approximately 16.0 dots. In the flick determination, since the movement distance does not satisfy the sixth condition (NO in step S404), the output control unit 126 is not notified of the "flick" event.

In this manner, in the present exemplary embodiment, when the user has not quickly moved the finger 501 at the time of releasing the finger 501, the threshold value for the movement distance in the proximity state is set to be relatively large, compared to when the user has quickly moved the finger 501 at the time of releasing the finger 501. This makes it difficult to incorrectly recognize that the "flick" has been performed. Further, even if the fifth condition is satisfied in the touch state in step S403, the operation is not recognized as the "flick" unless the seventh condition is satisfied in the proximity state after the release. This can prevent the information processing apparatus 100 from incorrectly recognizing the "flick" due to a slight movement of the input position that is detected by the sensor 108 at the end of the "move".

In the present exemplary embodiment, the movement distance and the movement speed are not calculated across the proximity state and the touch state. In other words, the position information in the proximity state is not used to acquire the touch state. The position information in the touch state is not used to acquire the proximity state. This separate handling is adopted in consideration of the fact that the position information is often inconsistent when different methods are employed for the sensors 109 and 108 used to detect the respective position information pieces in the proximity state and the touch state, in order to reduce or eliminate the influence thereof. However, the movement distance may be acquired regarding a movement across the proximity state and the touch state in an environment less likely to cause apparatus-dependent inconsistencies, such as an environment in which the respective position information pieces in the proximity state and the touch state are detected by the same sensor. For example, in FIG. 6A, a movement distance from the point 511 to the point 515 can be calculated as the movement distance in the proximity state before the touch (the movement distance before the operation object touches the input target surface). Further, in FIG. 6C, a movement distance from the point 602 may be calculated as the movement distance in the proximity state after the touch (the movement distance after the operation object is released from the input target surface). Further, the conditions for determining the touch operation (the values of the threshold values) can be changed according to a difference between accuracy of detecting the touch position and accuracy of detecting the proximity position. For example, in a case where there is a large difference between the accuracy of detecting the touch position and the accuracy of detecting the proximity position, the conditions for determining the touch operation are changed so as to become difficult to be satisfied, thereby preventing the information processing apparatus 100 from incorrectly recognizing the touch operation due to an accuracy error. On the contrary, in a case where the difference in the detection accuracy is small, the conditions for determining the touch operation are changed so as to become easy to be satisfied, thereby improving the followability to the touch operation. Alternatively, a weight may be added to a result of determination using position information detected at higher accuracy, thereby making the touch operation easy to be determined based on the position information detected as accurately as possible.

In the above-described manner, in the present exemplary embodiment, the information processing apparatus 100 acquires each of the information of the movements of the operation object, such as the user's finger 501, which is in the proximity to the input target surface for a touch operation before and after the touch operation, and the information of the movement of the operation object being in contact with the input target surface. Then, the information processing apparatus 100 recognizes the input touch operation while distinguishing it from the other operations according to whether each of the information pieces satisfies the predetermined condition. Especially, if the operation object has been moved by a long distance in the direction in parallel with the input target surface in the proximity state before the touch, the information processing apparatus 100 considers that the user is highly likely to input the "move" after the touch. Then, the information processing apparatus 100 changes the condition for the touch state so as to allow the "move" to be promptly recognized. On the other hand, if the operation object has been moved by a short distance in the direction in parallel with the input target surface in the proximity state before the touch, the information processing apparatus 100 considers that the user is less likely to input the "move" after the touch. Then, the information processing apparatus 100 changes the condition for the touch state so as to make the "move" difficult to be recognized. This can prevent the information processing apparatus 100 from incorrectly recognizing the "move" due to a slight movement of the detected position information when the user has an intention to input the "tap" and has no intention to move the finger 501 in the touch state. Further, when the user intends to input the "move", the information processing apparatus 100 can promptly recognize the "move" and starts the feedback of the display screen following up the movement of the finger 501. Further, if the finger 501 has been moved at a high speed immediately before the operation object leaves from the input target surface, the information processing apparatus 100 considers that the user is highly likely to perform the "flick". Then, the information processing apparatus 100 changes the condition for the proximity state after the touch so as to make the "flick" easy to be recognized. On the other hand, if the finger 501 has been moved at a low speed immediately before the operation object leaves from the input target surface, the information processing apparatus 100 considers that the user is highly likely to perform the release operation without performing the "flick". Then, the information processing apparatus 100 changes the condition for the proximity state after the touch so as to make the "flick" difficult to be recognized. According to the present exemplary embodiment, the above-described control processing can prevent the information processing apparatus 100 from incorrectly recognizing the "flick", unless the operation object is moved after the release, even when the movement speed immediately before the release is determined to be high due to a slight movement of the detected position information despite the user having no intention to input the "flick".

Modification Example

In the above-described first exemplary embodiment, the touch operation recognized by the recognition unit 125 is assumed to be the single-touch operation recognized based on the information of the single input position. On the other hand, the following describes a modification example that is applicable in a case where the information processing apparatus 100 can recognize both the single-touch operation and a multi-touch operation. In the modification example, the information processing apparatus 100 changes the condition for determining the information detected in the touch state, according to whether a condition for the number of input positions detected in the proximity state is satisfied. More specifically, if two or more proximity positions are detected regarding the operation object being in the proximity state, the information processing apparatus 100 determines whether the information detected in the touch state satisfies a condition for recognizing a predetermined multi-touch operation.

A hardware configuration and a functional configuration of the information processing apparatus 100 according to the exemplary modification are similar to FIGS. 1A and 1B according to the first exemplary embodiment, and therefore descriptions thereof will be omitted. However, if a plurality of operation objects (for example, a plurality of fingers) inputs touch positions, the recognition unit 125 according to the modification example determines based on those input touch positions whether the condition for recognizing the predetermined multi-touch operation is satisfied. For example, the recognition unit 125 determines whether a relative distance between the plurality of input touch positions satisfies the condition for the multi-touch operation such as a "pinch", which is an operation of enlarging and reducing the display image, and a "rotate", which is an operation of rotating the display image.

Figure 7:
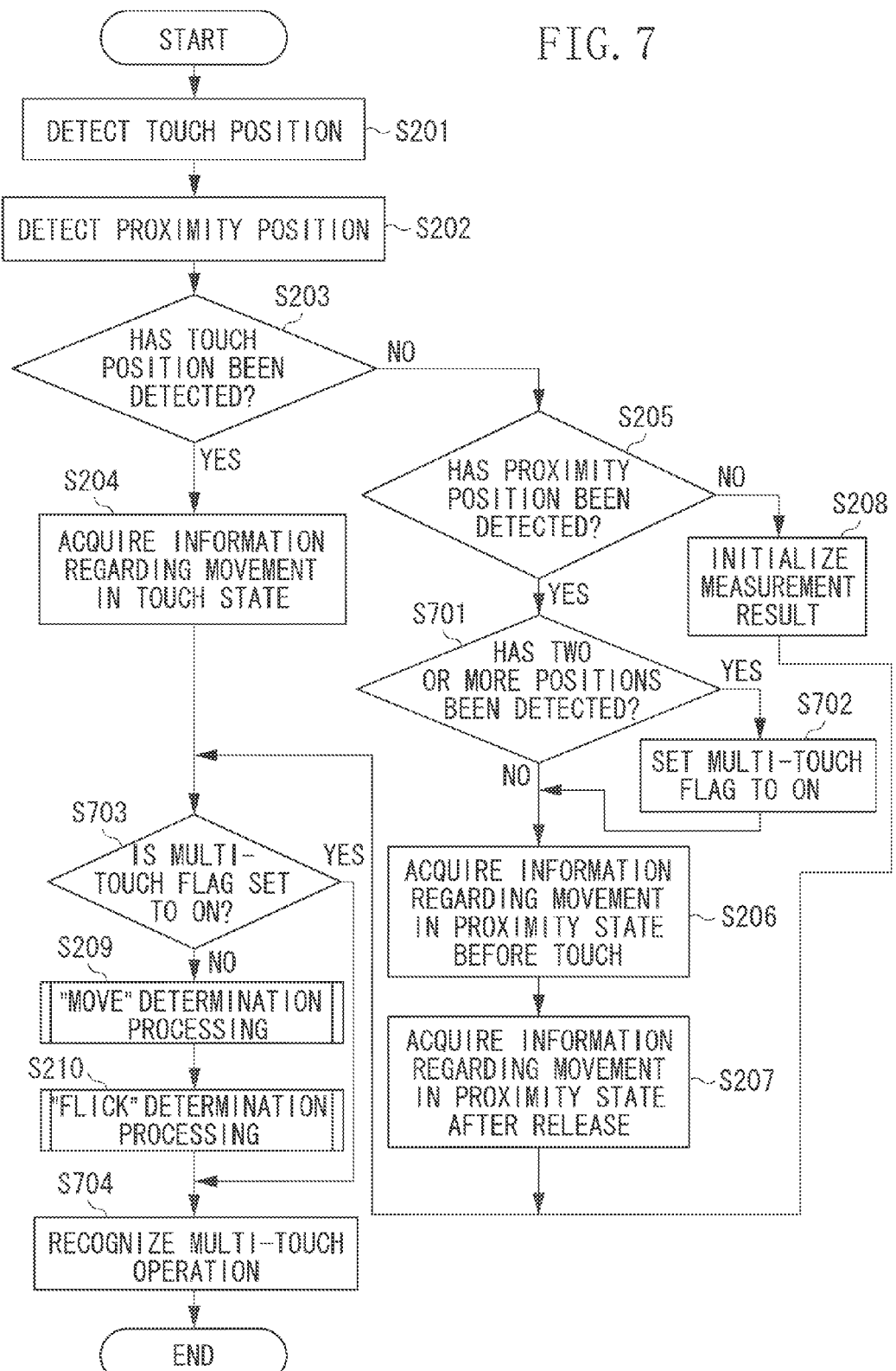
FIG. 7 is a flowchart illustrating an example of a flow of processing for determining the touch operation at the time of a multi-touch.

FIG. 7 is a flowchart illustrating an example of a flow of processing in which the information processing apparatus 100 determines the touch operation at the time of the multi-touch according to the present exemplary embodiment. Similar processes to the processes indicated in the flowchart illustrated in FIG. 2 are identified with the same step numbers, and descriptions thereof will be omitted.

In the modification example, if the proximity state acquisition unit 124 determines that the proximity position has been detected in step S205 (YES in step S205), the processing proceeds to step S701. In step S701, the recognition unit 125 determines whether two or more input positions have been detected in the proximity state before the touch. If the proximity state acquisition unit 124 determines that two or more input positions have been detected (YES in step S701), the processing proceeds to step S702. On the other hand, if the proximity state acquisition unit 124 determines that only a single input position has been detected (NO in step S701), the processing proceeds to step S206. In step S702, the recognition unit 125 sets a value of a multi-touch flag to "ON" and stores this information, since two or more operation objects are determined to have been detected. The multi-touch flag is a flag that is set to "ON" if the information processing apparatus 100 is in a state where the multi-touch operation is highly likely to be input, and an initial value thereof is "OFF".

In step S703, the recognition unit 125 determines whether the value of the multi-touch flag is set to "ON". If the value of the multi-touch flag is set to "ON" (YES in step S703), the processing proceeds to step S704 while skipping the move determination processing and the flick determination processing for the single-touch operation described in the first exemplary embodiment. If the value of the multi-touch flag is set to "OFF" (NO in step S703), the processing proceeds to step S209 to cause the information processing apparatus 100 to perform the processing for recognizing the single-touch operation.

In this manner, in the exemplary modification, the information processing apparatus 100 considers that the multi-touch operation is highly likely to be performed, if two or more proximity positions are detected at the time before the operation object touches the input target surface. Then, the information processing apparatus 100 omits the condition determination processing regarding the single-touch operation among preregistered recognizable touch operations. This can reduce the occurrence of misrecognition that the multi-touch operation becomes unrecognizable by being incorrectly recognized as the single-touch operation at the time when only one of the plurality of operation objects used in the multi-touch operation has touched the input target surface. For example, the information processing apparatus 100 can reduce the occurrence of misrecognition by which the multi-touch operation is recognized as the "move" of the single-touch operation to thereby cause the displayed image to start to be scrolled, resulting in the multi-touch operation being unrecognized and thus an inability to enlarge and reduce the image.

In the above-described exemplary modification, the information processing apparatus 100 omits the recognition of the single-touch operation itself in the state where it is considered that the multi-touch operation is highly likely to be performed. However, the information processing apparatus 100 may change the condition to a strict condition so as to make the single-touch operation difficult to be recognized, instead of omitting the processing. This allows the information processing apparatus 100 to recognize the single-touch operation according to the user's intention even when a second or subsequent operation object is detected by the proximity sensor 109 against the user's intention to perform the single-touch operation.

The above-described exemplary embodiment of the present invention can also be achieved by processing that supplies a program for realizing one or more function(s) of the above-described exemplary embodiment to a system or an apparatus via a network or a storage medium, and causes one or more processor(s) in a computer of the system or the apparatus to read out and execute the program. Further, the exemplary embodiment of the present invention can also be achieved by a circuit (for example, an application specific integrated circuit (ASIC)) capable of realizing one or more of the function(s).

According to the first exemplary embodiment and the modification example as described above, it is possible to reduce the misrecognition of the touch operation against the user's intention.

Embodiments of the present invention can also be realized by a computer of a system or apparatus that reads out and executes computer executable instructions recorded on a storage medium (e.g., a non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-188071, filed Sep. 16, 2014, which is hereby incorporated by reference herein in its entirety.

What is claimed is:

1. An information processing apparatus comprising:
one or more memories that store a set of instructions; and
one or more processors that execute the instructions to:
detect a touch position indicated by an operation object in contact with an input target surface;
detect a proximity position indicated by the operation object in proximity to the input target surface;
decide a condition for recognizing a type of operation with a plurality touch positions performed by the operation object as a moving operation, according to a movement amount of the detected proximity position before the touch position starts to be detected; and
recognize that the operation object has started the moving operation, based on the detected touch position and the decided condition.

2. The information processing apparatus according to claim 1, wherein the one or more processors execute the instructions to set a second condition or a third condition different from the second condition as the condition to be satisfied by the movement amount of the detected touch position, according to whether the movement amount of the detected proximity position satisfies a first condition before the touch position starts to be detected.

3. The information processing apparatus according to claim 1, wherein in a case where the proximity position, detected before the touch position starts to be detected, is moved by less than or equal to a predetermined movement amount, the one or more processors execute the instructions to set a stricter condition as the condition to be satisfied by the movement amount of the touch position, compared to a case where the proximity position, detected before the touch position starts to be detected, is moved by a movement amount larger than the predetermined movement amount.

4. The information processing apparatus according to claim 2, wherein the second condition is larger than the third condition to be satisfied in a case where the operation object is in contact with the input target surface, immediately after having been moved, while being in proximity to the input target surface, by a movement amount larger than a predetermined movement amount in a direction in parallel with the input target surface.

5. The information processing apparatus according to claim 4, wherein, in a case where the detected touch position is further moved after recognizing that the operation object has started the moving operation, the one or more processors execute the instructions to recognize that the operation object continues the moving operation, according to whether a movement amount of the touch position satisfies a fourth condition.

6. The information processing apparatus according to claim 5, wherein the fourth condition is a condition more likely to be satisfied than the condition to be satisfied by the movement amount of the detected touch position in order to determine whether the operation object has started the moving operation.

7. The information processing apparatus according to claim 1, wherein the one or more processors execute the instructions to perform recognizing over a series of operations of the operation object including a transition from a state where the operation object is not in contact with the input target surface to a state where the operation object is in contact with the input target surface.

8. An information processing apparatus comprising:
one or more memories that store a set of instructions; and
one or more processors that execute the instructions to:
detect a touch position indicated by an operation object in contact with an input target surface;
detect a proximity position indicated by an operation object in proximity to the input target surface;
decide a condition for recognizing a type of operation with a touch performed by the operation object as a flick operation, according to a movement amount of the detected proximity position after the touch position becomes undetected; and
recognize that the operation object has input the flick operation, based on the decided condition and a movement speed of the detected touch position.

9. The information processing apparatus according to claim 8, wherein the one or more processors execute the instructions to set a second condition or a third condition different from the second condition as the condition to be satisfied by the movement amount of the detected proximity position after the touch position becomes undetected, according to whether the movement speed of the detected touch position before the touch position becomes undetected satisfies a first condition.

10. The information processing apparatus according to claim 8, wherein in a case where the movement speed of the touch position, detected before the touch position becomes undetected, is less than or equal to a predetermined speed, the one or more processors execute the instructions to set a stricter condition as the condition to be satisfied by the movement amount of the proximity position after the touch position becomes undetected, compared to a case where the movement speed of the touch position, detected before the touch position becomes undetected, is higher than the predetermined speed.

11. The information processing apparatus according to claim 9, wherein the second condition is larger than the third condition to be satisfied in a case where the operation object is in proximity to the input target surface, having been released from the input target surface while being moved at a speed greater than a predetermined speed.

12. The information processing apparatus according to claim 8, wherein the one or more processors execute the instructions to perform recognizing over a series of operations of the operation object including a transition from a state where the operation object is in contact with the input target surface to a state where the operation object is not in contact with the input target surface.

13. A method for controlling an information processing apparatus, the method comprising:
detecting a touch position indicated by an operation object in contact with an input target surface;
detecting a proximity position indicated by the operation object in proximity to the input target surface;
deciding a condition for recognizing a type of operation with a plurality of touch positions performed by the operation object as a moving operation, according to a movement amount of the detected proximity position before the touch position starts to be detected; and
recognizing that the operation object has started the moving operation, based on the detected touch position and the decided condition.

14. A method for controlling an information processing apparatus, the method comprising:
detecting a touch position indicated by an operation in contact with an input target surface;
detecting a proximity position indicated by an operation object in proximity to the input target surface;
deciding a condition for recognizing a type of operation with a touch performed by the operation object as a flick operation, according to a movement amount of the detected proximity position after the touch position becomes undetected; and
recognizing that the operation object has input the flick operation, based on the decided condition and a movement speed of the detected touch position.

15. A non-transitory storage medium storing a program that causes, by being read and executed by a computer, the computer to perform a method for controlling an information processing apparatus, the method comprising:
detecting a touch position indicated by an operation object in contact with an input target surface;
detecting a proximity position indicated by the operation object in proximity to the input target surface;
deciding a condition for recognizing a type of operation with a plurality of touch positions performed by the operation object as a moving operation, according to a movement amount of the detected proximity position before the touch position starts to be detected; and
recognizing that the operation object has started the moving operation, based on the detected touch position and the decided condition.

16. A non-transitory storage medium storing a program that causes, by being read and executed by a computer, the computer to perform a method for controlling an information processing apparatus, the method comprising:

detecting a touch position indicated by an operation in contact with an input target surface;

detecting a proximity position indicated by an operation object in proximity to the input target surface;

deciding a condition for recognizing a type of operation with a touch performed by the operation object as a flick operation, according to a movement amount of the detected proximity position after the touch position becomes undetected; and recognizing that the operation object has input the flick operation, based on the decided condition and a movement speed of the detected touch position.

17. The information processing apparatus according claim 1, wherein, in deciding a condition, a threshold for movement distance of the plurality of touch positions for recognition as a moving operation is decided according to the movement amount of the detected proximity position before the touch position starts to be detected.

18. The information processing apparatus according to claim 17 wherein the threshold for movement distance in a case where the movement amount of the proximity position is larger than a predetermined amount is decided to be a value less than the threshold for movement distance in a case where the movement amount of the proximity position is smaller than the predetermined amount.

19. An information processing apparatus comprising:
one or more memories that store a set of instructions; and
one or more processors that execute the instructions to:
detect a touch position indicated by an operation object in contact with an input target surface;
detect a proximity position indicated by the operation object in proximity to the input target surface;
change an initial condition for recognizing a type of operation with a plurality of touch positions performed by the operation object as a moving operation, according to a movement amount of the detected proximity position before the touch position starts to be detected; and
recognize that the operation object has started the moving operation, based on the detected touch position and the changed condition.

* * * * *